United States Patent
Andrew

(10) Patent No.: US 7,277,489 B1
(45) Date of Patent: Oct. 2, 2007

(54) TWO DIMENSIONAL DISCRETE WAVELET TRANSFORMS

(75) Inventor: James Philip Andrew, Waverton (AU)

(73) Assignee: Canon Kabushiki Kaisha, Tokyo (JP)

(*) Notice: Subject to any disclaimer, the term of this patent is extended or adjusted under 35 U.S.C. 154(b) by 724 days.

(21) Appl. No.: 09/614,549

(22) Filed: Jul. 12, 2000

(30) Foreign Application Priority Data

Jul. 12, 1999 (AU) .................................. PQ1562

(51) Int. Cl.
*H04N 7/18* (2006.01)

(52) U.S. Cl. .............................. 375/240.19; 375/240.18

(58) Field of Classification Search .................... 375/240.18–240.2; 382/240–250
See application file for complete search history.

(56) References Cited

U.S. PATENT DOCUMENTS

| | | | | |
|---|---|---|---|---|
| 5,870,145 A | * | 2/1999 | Yada et al. | 375/240.04 |
| 5,949,912 A | * | 9/1999 | Wu | 382/246 |
| 6,157,746 A | * | 12/2000 | Sodagar et al. | 382/240 |
| 6,523,051 B1 | * | 2/2003 | Majani et al. | 708/300 |
| 6,584,154 B1 | * | 6/2003 | Wu | 375/240.16 |
| 6,741,666 B1 | | 5/2004 | Henry et al. | 375/350 |

* cited by examiner

*Primary Examiner*—Andy Rao
(74) *Attorney, Agent, or Firm*—Fitzpatrick, Cella, Harper & Scinto

(57) ABSTRACT

The method performs a two-dimensional discrete wavelet transform on an image. The image comprises a plurality of blocks of pixels. The method generates (340) a current output block of subband data corresponding to a current block. The current output block is generated before either a one-dimensional discrete wavelet row or column transformation of a next block of pixels is completed, using intermediate lifting values stored (310, 350) during the generation of a plurality of previous blocks of subband data.

36 Claims, 12 Drawing Sheets input image          LL, HL, LH and LL subbands

TWO DIMENSIONAL DISCRETE WAVELET TRANSFORMS

COPYRIGHT NOTICE

This patent specification contains material that is subject to copyright protection. The copyright owner has no objection to the reproduction of this patent specification or related materials from associated patent office files for the purposes of review, but otherwise rescues all copyright whatsoever.

TECHNICAL FIELD OF THE INVENTION

The present invention relates generally to data compression and, in particular, to image compression. The present invention relates to amongst other things to a method and apparatus for two-dimensional discrete wavelet transforming an image. The invention also relates to a computer readable medium comprising a computer program for two-dimensional discrete wavelet transforming an image.

BACKGROUND ART

The field of digital data compression and in particular digital image compression has attracted a great interest for some time. Most recently, compression schemes based on a Discrete Wavelet Transform (DWT) have become increasingly popular because the DWT offers a non-redundant hierarchical decomposition of an image and resultant compression of the image provides favourable rate-distortion statistics.

Typically, the discrete wavelet transform (DWT) of an image is performed using a series of one-dimensional DWTs. A one-dimensional DWT of a signal (ie an image row) is performed by lowpass and highpass filtering the signal, and decimating each filtered signal by 2. Decimation by 2 means that only every second sample of the filtering processes is calculated and retained. When performing a convolution (filtering) the filter is moved along by two samples at a time, instead of the usual one sample, to effect the decimation by 2. In this way for a signal of N samples there are N DWT samples: N/2 lowpass samples and N/2 highpass samples. Strictly speaking this is a single level one dimensional DWT. However, since only single level one-dimensional DWTs are used in this description, they are referred to simply as a one-dimensional DWT (1D DWT).

FIG. 8 illustrates a typical process for performing a single level two-dimensional DWT of an input image. Each column of the image is analysed with a one-dimensional DWT giving output columns whose first half consists of lowpass samples and second half consists of highpass samples. A single level one-dimensional DWT of a column is referred to as a column DWT. The analysis of each column results in two sub-images labelled $L^c$ and $H^c$. The columns of $L^c$ consists of the lowpass filtered (and decimated) columns of the input image and the columns of $H_c$ consists of the highpass filtered (and decimated) columns of the input image. The rows of the resulting output image are then analysed with a one-dimensional DWT, or row DWT, as illustrated in FIG. 8. This results in four sub-images or subbands, labelled LL, HL, LH and HH, where L and H refer to lowpass and highpass respectively, and in the two letter label the first letter corresponds to the row filter, while the second to the column filter. That is, the HL subband is the result of lowpass filtering the columns (and decimating by 2) and highpass filtering the resulting rows (and decimating by 2). The LL subband is also called the DC or low frequency subband while the HL, LH and HH are called AC or high frequency subbands. Depending on the context, a single level two-dimensional DWT of an image is referred to as a single level DWT (or even simply DWT) of an image.

Each one-dimensional DWT can be inverted. That is having analysed a one-dimensional signal of N samples into N/2 lowpass and N/2 highpass subband samples these subband samples, of which there are N in total, can be synthesized with a one-dimensional inverse DWT, into the N samples of the original one-dimensional signal. Thus the original image can be reconstructed by synthesising the rows then the columns of a single level DWT of an image. This is also illustrated in FIG. 8. Thus a single level (two-dimensional) DWT is invertible. The process of a inverting a DWT is often referred to as synthesis or applying and an inverse DWT, or simply iDWT.

For a two level DWT the LL subband is further analysed with a single level DWT into four subbands, just as the original image was analysed into four subbands. For a three level DWT the resulting LL subband is again analysed, and so on for an arbitrary number of levels of the DWT. Thus a multi-level DWT or simply DWT of an image can be performed by iterating a single level DWT some finite number of times on subsequent LL subbands, where the first LL subband is the original image. A multi-level DWT can be inverted by simply inverting each single level DWT.

At each level of a multi-level DWT there are three high frequency subbands, the HL, LH and HH subbands. Therefore, for a more precise notation a level number is included in the labelling of the subbands. Thus the four subbands illustrated in FIG. 8 are more precisely denoted LL1, HL1, LH1 and HH1. Similarly the three high frequency subbands at level 2, resulting from the single level DWT of the LL1 subband, are denoted HL2, LH2 and HH2. Using this subband notation the original image can be labelled as the LL0 subband.

Image compression is typically executed on general purpose computers and also on application specific devices (ASIC). Both of these systems employ an architecture where the main processing unit has access to different memory units. These memories are differentiated by size and speed of access (and cost). For the purposes of our discussion it suffices to consider two memories: namely a fast memory, that is typically on the same chip as the processor and is relatively small, and a slower memory, that is typically on another chip to that of the processor and is relatively large. The fast smaller memory is referred to as local or internal memory, and the slower larger memory as external memory.

The frequency of and hence the amount of time it takes to read and or write data from and to memory (typically into or out of registers) is referred to as bandwidth. Internal bandwidth refers to read and write accessed from and to internal memory, while that from and to external memory is referred to as external bandwidth.

In some image compression methods the subbands resulting from a DWT are tiled into blocks of samples. For example, each block consists of say H rows by H columns. A row of blocks in a subband consists of H lines of the subband. Each block is quantised and entropy coded substantially independently. Thus each block can be entropy decoded (and dequantized) independently. A block essentially becomes a minimum coded unit. The blocks are not necessarily strictly independently encoded. Some small amount of information, such as the most significant bit plane in each block, may be coded together for all blocks in a subband. However, if the time or effort required to encode or decode such information for one block is trivial when compared to encoding or decoding a whole block, then for our purposes it is considered that the blocks are coded independently.

A single level DWT of an image is typically performed by buffering the entire image in memory and performing the DWT on the buffered image. Unfortunately, this approach requires a large amount of memory, particularly for image of 2000 pixels×2000 pixels or more. Thus a relatively large amount of (slower) external memory is required. Further several write and read accesses to and from this slower external memory are required to perform the DWT. These accesses then restrict the speed at which the whole DWT can be performed.

A line-based implementation of a DWT, can be employed to reduce the amount of memory required to perform the DWT and iDWT of an image, A line-based DWT typically performs the 2D DWT operation in vertical segments. That is for example, some number of input image rows are first row transformed, right across the image, and then the resulting transformed rows (partially) vertically transformed, to produce some number of lines of each of the LL, HL, LH and HH subbands. Then a next segment of input image rows are transformed horizontally, and the resulting lines, plus perhaps some of the previous horizontally transformed lines, are vertically transformed to produce a next set of output subband lines, and so on. A lifting implementation of a line-based DWT has been proposed that requires a fewer number of lines to be buffered, and less computation than a convolution line-based DWT. These line-based DWTs are two-pass in that in one dimension the full transform is carried out (that is for the entire signal length in that dimension).

A line-based DWT typically require significantly less memory (line buffering) than the full-image DWT, but the bandwidth between processor and external memory (or typically a secondary level cache) still remains high. Further, for compression purposes, typically the high frequency subband code blocks need to be buffered in external memory before quantization and entropy encoding, thus adding to memory and bandwidth costs.

SUMMARY OF THE INVENTION

It is an object of the present invention to substantially overcome, or at least ameliorate, one or more disadvantages of existing arrangements.

According to one aspect of the invention, there is provided a method of two-dimensional discrete wavelet transforming an image, wherein said image comprises a plurality of blocks of pixels, the method comprising the step of: generating a current output block of subband data corresponding to a current said block of pixels before either a one-dimensional discrete wavelet row or column transformation of a next said block of pixels is completed, using intermediate lifting values of a plurality of previous said output blocks of subband data.

According to another aspect of the invention, there is provided a method of two-dimensional discrete wavelet transforming an image, wherein said image comprises a plurality of blocks of pixels arranged in a predetermined raster order, and substantially all of said blocks each comprising one quadruplet of said pixels, the method comprising the steps of: scanning said blocks in said predetermined raster order; generating a current output block of subband data corresponding to a current said block of one quadruplet of pixels before either a one-dimensional discrete wavelet row or column transformation of a next said block of pixels is completed, using intermediate lifting values generated and stored during a plurality of said generating and storing steps of a plurality of previous said output blocks of subband data; storing intermediate lifting values generated during the generating step of the current output block of subband data; and repeating the generating step for the said scanned blocks of pixels from said next block of pixels to a last block of pixels and said storing step for the said scanned blocks of pixels from said next block of pixels to a penultimate block of pixels.

According to still another aspect of the invention, there is provided a method of two-dimensional inverse discrete wavelet transforming subband data, wherein said subband data comprises a plurality of blocks of subband data and said blocks each comprising at least one quadruplet of LL, HL, LH and HH subband coefficients, the method comprising the step of: generating a current output block of pixels corresponding to a current said block of at least one said quadruplet of subband coefficients before either a one-dimensional inverse discrete wavelet row or column transformation of a next said block of subband coefficients is completed, using intermediate lifting values of a plurality of previous said output blocks of pixels.

According to still another aspect of the invention, there is provided a method of two-dimensional inverse discrete wavelet transforming subband data, wherein said subband data comprises a plurality of blocks of subband data arranged in a predetermined raster order, and said blocks each comprising one quadruplet of LL, HL, LH and HH subband coefficients, the method comprising the steps of: scanning said blocks in said predetermined raster order, generating a current output block of pixels corresponding to a current said block of one quadruplet of LL, HL, LH and HH subband coefficients before either a one-dimensional discrete wavelet row or column transformation of a next said block LL, HL, LH and HH subband coefficients is completed, using intermediate lifting values generated and stored during a plurality of said generating and storing steps of a plurality of previous said output blocks of pixels; storing intermediate lifting values generated during the generating step of the current output block of pixels; and repeating the generating step for the said scanned blocks of one quadruplet of LL, HL, LH and HH subband coefficients from said next block of one quadruplet of LL, HL, LH and HH subband coefficients to a last block of one quadruplet of LL, HL, LH and HH subband coefficients and said storing step for the said scanned blocks of one quadruplet of LL, HL, LH and HH subband coefficients from said next block of one quadruplet of LL, HL, LH and HH subband coefficients to a penultimate block of one quadruplet of LL, HL, LH and HH subband coefficients.

According to still another aspect of the invention, there is provided a method of decoding a compressed bit stream, said compressed bit stream being derived from an discrete wavelet transform image comprising a low-low frequency subband and a plurality of high frequency subbands, each subband been divided into plurality of blocks and each block substantially independently entropy encoded into said compressed bit stream, the method comprising the steps of: a) entropy decoding a current block of each high frequency subband at a current level and storing said entropy decoding blocks in to a plurality of corresponding local subband memory buffers; b) If said current level is a highest level of the discrete wavelet transform image then: ba) entropy decoding a to corresponding block of the low-low frequency subband of said current level and storing said block into a local low-low subband memory buffer; otherwise bb)

extracting a corresponding low-low frequency subband block, for said current level, from an external memory buffer and storing said extracted block in said local low-low subband memory buffer; c) storing, as required, a predetermined number of column overlap values and a predetermined number of row overlap values into a column memory buffer and a row memory buffer respectively; d) using said overlap values to perform an inverse discrete wavelet transform upon each block stored in said plurality of corresponding local subband buffers and the local low-low subband buffer, to produce a block of coefficients of a low-low subband at one level below said current level; e) updating said row memory buffer and said column memory buffer; and f) storing said block of coefficients of the low-low subband at the level below said current level into said external memory buffer.

According to still another aspect of the invention, there is provided a method of decoding a compressed bit stream comprising the steps of: a) entropy decoding a current block of each high frequency subband at a current level; b) entropy decoding a corresponding block of a low-low frequency subband of said current level; c) retrieving, as required, a predetermined number of column overlap values and a predetermined number of row overlap values; d) using said overlap values to perform an inverse discrete wavelet transform upon each entropy decoded block to produce a block of coefficients of a low-low frequency subband at a level below said current level; and e) outputting said block of coefficients of the low-low subband at the level below said current level.

According to still another aspect of the invention, there is provided a method of rearranging a compressed bit stream to improve memory buffering at a bit stream decoder; the method comprising the steps of: parsing an encoded bit stream arranged in a predetermined order for a first decoder; identifying, in said bit stream, segments of the bit stream that have been encoded substantially independently of other segments of the bit stream; and re-ordering said identified segments into a second bit stream to minimise buffering of said second bit stream at a second decoder.

According to still another aspect of the invention, there is provided apparatus for two-dimensional discrete wavelet transforming an image, wherein said image comprises a plurality of blocks of pixels, the apparatus comprising: means for storing a plurality of pixels necessary for calculating a current block of subband data; and means for generating said current output block of subband data corresponding to a current said block of pixels before either a one-dimensional discrete wavelet row or column transformation of a next said block of pixels is completed, using intermediate lifting values of a plurality of previous said output blocks of subband data.

According to still another aspect of the invention, there is provided apparatus for two-dimensional discrete wavelet transforming an image, wherein said image comprises a plurality of blocks of pixels arranged in a predetermined raster order, and substantially all of said blocks each comprising one quadruplet of said pixels, the apparatus comprising: means for scanning said blocks in said predetermined raster order; means for generating a current output block of subband data corresponding to a current said block of one quadruplet of pixels before either a one-dimensional discrete wavelet row or column transformation of a next said block of pixels is completed, using intermediate lifting values generated and stored during the operations of said generating and storing means for a plurality of previous said output blocks of subband data; means for storing intermediate lifting values generated during the operation of the generating means of the current output block of subband data; and means for repeating the operation of the generating means for the said scanned blocks of pixels from said next block of pixels to a last block of pixels and said operation of the storing means for the said scanned blocks of pixels from said next block of pixels to a penultimate block of pixels.

According to still another aspect of the invention, there is provided apparatus for two-dimensional inverse discrete wavelet transforming subband data, wherein said subband data comprises a plurality of blocks of subband data and said blocks each comprising at least one quadruplet of LL, HL, LH and HH subband coefficients, the apparatus comprising: means for storing subband data necessary for calculating a current block of pixels; and means for generating a current output block of pixels corresponding to a current said block of at least one said quadruplet of subband coefficients before either a one-dimensional inverse discrete wavelet row or column transformation of a next said block of subband coefficients is completed, using intermediate lifting values of a plurality of previous said output blocks of pixels.

According to still another aspect of the invention, there is provided apparatus for two-dimensional inverse discrete wavelet transforming subband data, wherein said subband data comprises a plurality of blocks of subband data arranged in a predetermined raster order, and said blocks each comprising one quadruplet of LL, HL, LH and HH subband coefficients, the apparatus comprising: means for scanning said blocks in said predetermined raster order; means for generating a current output block of pixels corresponding to a current said block of one quadruplet of LL, HL, LH and HH subband coefficients before either a one-dimensional discrete wavelet row or column transformation of a next said block LL, HL, LH and HH subband coefficients is completed, using intermediate lifting values generated and stored during the operations of the generating and storing means for a plurality of previous said output blocks of pixels; means for storing intermediate lifting values generated during the generating means of the current output block of pixels; and means for repeating the operation of the generating means for the said scanned blocks of one quadruplet of LL, HL, LH and HH subband coefficients from said next block of one quadruplet of LL, HL, LH and HH subband coefficients to a last block of one quadruplet of LL, HL, LH and HH subband coefficients and the operation of the said storing means for the said scanned blocks of one quadruplet of LL, HL, LH and HH subband coefficients from said next block of one quadruplet of LL, HL, LH and HH subband coefficients to a penultimate block of one quadruplet of LL, HL, LH and HH subband coefficients.

According to still another aspect of the invention, there is provided apparatus for decoding a compressed bit stream, said compressed bit stream being derived from an discrete wavelet transform image comprising a low-low frequency subband and a plurality of high frequency subbands, each subband been divided into plurality of blocks and each block substantially independently entropy encoded into said compressed bit stream, the apparatus comprising: means for entropy decoding a current block of each high frequency subband at a current level and storing said entropy decoding blocks in to a plurality of corresponding local subband memory buffers; means for entropy decoding, if said current level is a highest level of the discrete wavelet transform image, a corresponding block of the low-low frequency subband of said current level and storing said block into a local low-low subband memory buffer; otherwise extracting a corresponding low-low frequency subband block, for said current level, from an external memory buffer and storing said extracted block in said local low-low subband memory buffer; means for storing, as required, a predetermined number of column overlap values and a predetermined number of row overlap values into a column memory buffer and a row memory buffer respectively; means for using said overlap values to perform an inverse discrete wavelet transform upon each block stored in said plurality of corresponding local subband buffers and the local low-low subband buffer, to produce a block of coefficients of a low-low subband at one level below said current level; means or updating said row memory buffer and said column memory buffer; and means for storing said block of coefficients of the low-low subband at the level below said current level into said external memory buffer.

According to still another aspect of the invention, there is provided apparatus for decoding a compressed bit stream, the apparatus comprising: means for entropy decoding a current block of each high frequency subband at a current level; means for entropy decoding a corresponding block of a low-low frequency subband of said current level; means for retrieving, as required, a predetermined number of column overlap values and a predetermined number of row overlap values; means for using said overlap values to perform an inverse discrete wavelet transform upon each entropy decoded block to produce a block of coefficients of a low-low frequency subband at a level below said current level; and means for outputting said block of coefficients of the low-low subband at the level below said current level.

According to still another aspect of the invention, there is provided apparatus for rearranging a compressed bit stream to improve memory buffering at a bit stream decoder; the apparatus comprising: means for parsing an encoded bit stream arranged in a predetermined order for a first decoder; means for identifying, in said bit stream, segments of the bit stream that have been encoded substantially independently of other segments of the bit stream; and means for re-ordering said identified segments into a second bit stream to minimise buffering of said second bit stream at a second decoder.

According to still another aspect of the invention, there is provided a computer readable medium comprising a computer program for two-dimensional discrete wavelet transforming an image, wherein said image comprises a plurality of blocks of pixels and substantially all of said blocks each comprising at least one quadruplet of said pixels, the computer program comprising: code for generating a current output block of subband data corresponding to a current said block of at least one quadruplet of pixels before either a one-dimensional discrete wavelet row or column transformation of a next said block of pixels is completed, using intermediate lifting values of a plurality of previous said output blocks of subband data.

According to still another aspect of the invention, there is provided a computer readable medium comprising a computer program for two-dimensional discrete wavelet transforming an image, wherein said image comprises a plurality of blocks of pixels arranged in a predetermined raster order, and substantially all of said blocks each comprising one quadruplet of said pixels, the computer program comprising: code for scanning said blocks in said predetermined raster order; code for generating a current output block of subband data corresponding to a current said block of one quadruplet of pixels before either a one-dimensional discrete wavelet row or column transformation of a next said block of pixels is completed, using intermediate lifting values generated and stored during the operations of said generating and storing code for a plurality of previous said output blocks of subband data; code for storing intermediate lifting values generated during the operation of the generating code of the current output block of subband data; and code for repeating the operation of the generating means for the said scanned blocks of pixels from said next block of pixels to a last block of pixels and said operation of the storing code for the said scanned blocks of pixels from said next block of pixels to a penultimate block of pixels.

According to still another aspect of the invention, there is provided a computer readable medium comprising a computer program for two-dimensional inverse discrete wavelet transforming subband data, wherein said subband data comprises a plurality of blocks of subband data and said blocks each comprising at least one quadruplet of LL, HL, LH and HH subband coefficients, the computer program comprising: code for generating a current output block of pixels corresponding to a current said block of at least one said quadruplet of subband coefficients before either a one-dimensional inverse discrete wavelet row or column transformation of a next said block of subband coefficients is completed, using intermediate lifting values of a plurality of previous said output blocks of pixels.

According to still another aspect of the invention, there is provided a computer readable medium comprising a computer program for two-dimensional inverse discrete wavelet transforming subband data, wherein said subband data comprises a plurality of blocks of subband data arranged in a predetermined raster order, and said blocks each comprising one quadruplet of LL, HL, LH and HH subband coefficients, the computer program comprising: code for scanning said blocks in said predetermined raster order; code for generating a current output block of pixels corresponding to a current said block of one quadruplet of LL, HL, LH and HH subband coefficients before either a one-dimensional discrete wavelet row or column transformation of a next said block LL, HL, LH and HH subband coefficients is completed, using intermediate lifting values generated and stored during the operations of the generating and storing code for a plurality of previous said output blocks of pixels; code for storing intermediate lifting values generated during the generating code of the current output block of pixels; and code for repeating the operation of the generating code for the said scanned blocks of one quadruplet of LL, HL, LH and HH subband coefficients from said next block of one quadruplet of LL, HL, LH and HH subband coefficients to a last block of one quadruplet of LL, HL, LH and HH subband coefficients and the operation of the said storing code for the said scanned blocks of one quadruplet of LL, HL, LH and HH subband coefficients from said next block of one quadruplet of LL, HL, LH and HH subband coefficients to a penultimate block of one quadruplet of LL, HL, LH and HH subband coefficients.

According to still another aspect of the invention, there is provided a computer readable medium comprising a computer program for decoding a compressed bit stream, said compressed bit stream being derived from an discrete wavelet transform image comprising a low-low frequency subband and a plurality of high frequency subbands, each subband been divided into plurality of blocks and each block substantially independently entropy encoded into said compressed bit stream, the computer program comprising: code for entropy decoding a current block of each high frequency subband at a current level and storing said entropy decoding blocks in to a plurality of corresponding local subband memory buffers; code for entropy decoding, if said current level is a highest level of the discrete wavelet transform image, a corresponding block of the low-low frequency subband of said current level and storing said block into a local low-low subband memory buffer; otherwise extracting a corresponding low-low frequency subband block, for said current level, from an external memory buffer and storing said extracted block in said local low-low subband memory buffer; code for storing, as required, a predetermined number of column overlap values and a predetermined number of row overlap values into a column memory buffer and a row memory buffer respectively; code for using said overlap values to perform an inverse discrete wavelet transform upon each block stored in said plurality of corresponding local subband buffers and the local low-low subband buffer, to produce a block of coefficients of a low-low subband at one level below said current level; code for updating said row memory buffer and said column memory buffer; and code for storing said block of coefficients of the low-low subband at the level below said current level into said external memory buffer.

According to still another aspect of the invention, there is provided a computer readable medium comprising a computer program for decoding a compressed bit stream, the computer program comprising: code for entropy decoding a current block of each high frequency subband at a current level; code for entropy decoding a corresponding block of a low-low frequency subband of said current level; code for retrieving, as required, a predetermined number of column overlap values and a predetermined number of row overlap values; code for using said overlap values to perform an inverse discrete wavelet transform upon each entropy decoded block to produce a block of coefficients of a low-low frequency subband at a level below said current level; and code for outputting said block of coefficients of the low-low subband at the level below said current level.

According to still another aspect of the invention, there is provided a computer readable medium comprising a computer program for rearranging a compressed bit stream to improve memory buffering at a bit stream decoder; the computer program comprising: code for parsing an encoded bit stream arranged in a predetermined order for a first decoder; code for identifying, in said bit stream, segments of the bit stream that have been encoded substantially independently of other segments of the bit stream; and code for re-ordering said identified segments into a second bit stream to minimise buffering of said second bit stream at a second decoder.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
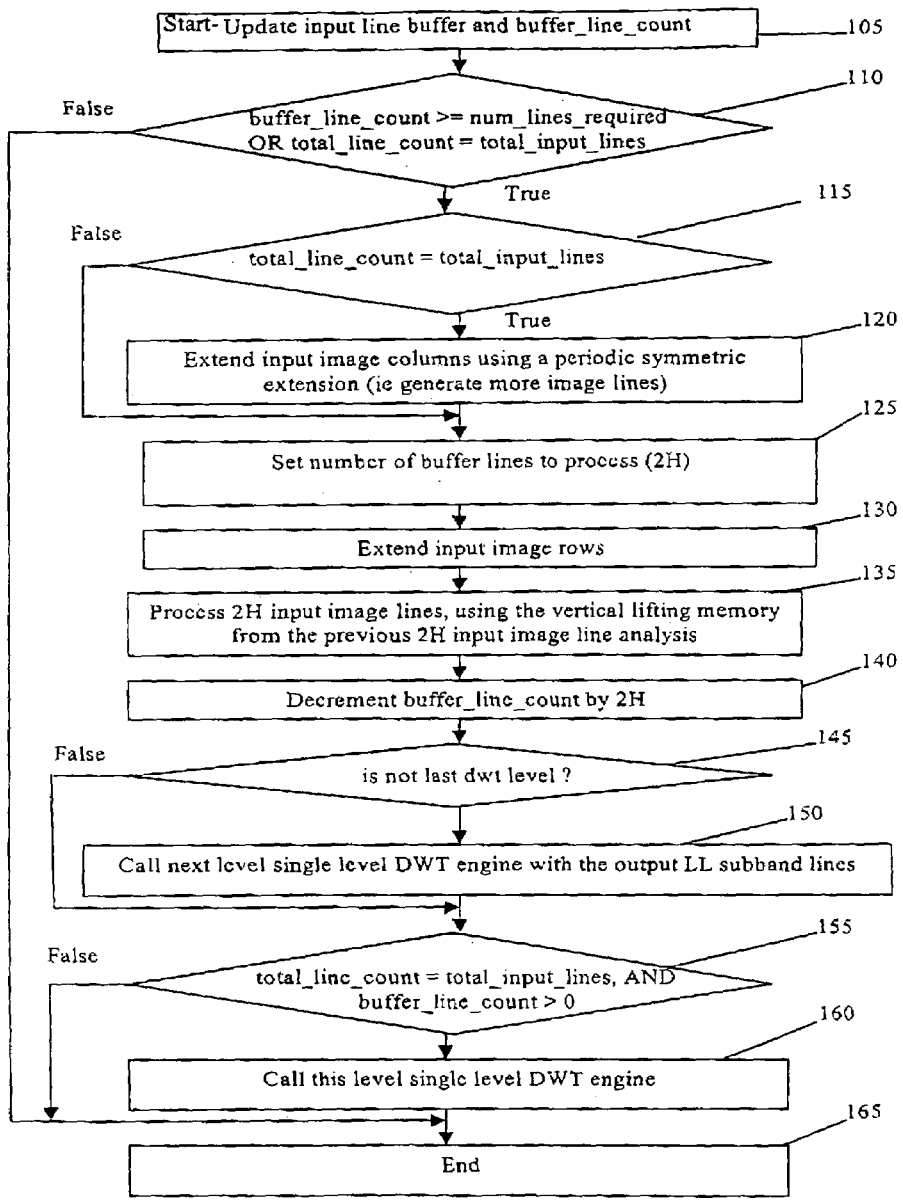
FIG. 1 is a flow diagram of a single level DWT engine (sub-procedure) for use in step 410 of the method shown in FIG. 4 in accordance with the first and second preferred embodiment.

Where reference is made in any one or more of the accompanying drawings to steps and/or features, which have the same reference numerals, those steps and/or features have for the purposes of this description the same function(s) or operation(s), unless the contrary intention appears.

The principles of the preferred method, apparatus and computer readable medium described herein have general applicability to data compression. However, for ease of explanation, the preferred method, apparatus and computer readable medium are described with reference to digital still image compression. However, it is not intended that the present invention be limited to the described apparatus and method. For example, the invention may have application to digital video decompression.

Throughout the specification a reference to the term image is to be construed, unless otherwise stated, as an image in the spatial domain or its equivalent in the frequency domain depending upon the context in which the term image is used. Where an ambiguity may arise the terms "original image" shall be used as the spatial domain image and "DWT image" as the corresponding frequency domain image. Similarly, a reference to "sub-image" shall be taken to mean a portion or part of an image.

Apart from precision effects the order in which the rows and columns of pixels are transformed or inverse transformed does not usually effect the result of the DWT or iDWT of an image. The description given here describes that the columns are transformed first and then the rows for the forward DWT, and that the rows are inverse transformed first, followed by the columns for the inverse DWT, in order to keep the description clear. However, the invention is not limited as such and can include that the rows are transformed first and then the columns for the forward DWT, and that the columns are inverse transformed first, followed by the rows for the inverse DWT. Throughout the description and claims, a reference to a "row" and a "column" can alternatively be taken to include a reference to a "column" and a "row" respectively.

1.0 Block Based Entropy Coding of DWT Subband Image Data

Figure 9:
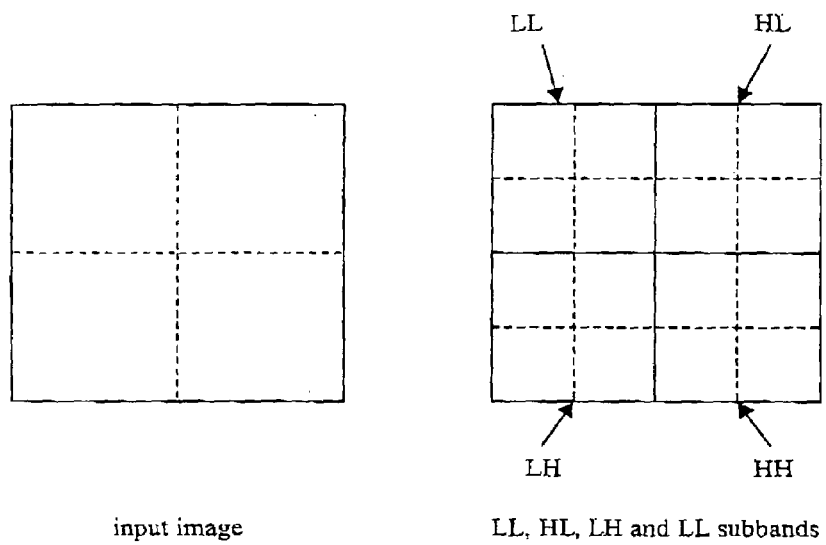
FIG. 9 illustrates the correspondence between blocks in the input image and the LL, HL, LH, and HH subbands in accordance with the first, second and third preferred embodiments.

The method of implementing a two-dimensional discrete wavelet transform in accordance with the first and second preferred embodiments are done on a block basis as will be described in more detail with reference to FIG. 9. This enables a whole block of subband data to be fully entropy coded and decoded in an efficient and convenient manner. The whole block of data can be held in local memory during encoding or decoding, so that the processor requires minimal interaction with external memory, while executing these processes.

1.2 Lifting Implementation of the 5/3 And 9/7 Filters

The method of implementing a two-dimensional discrete wavelet transform in accordance with the first and second preferred embodiments preferably utilise a 5/3 or a 9/7 wavelet filter of the type described in the draft JPEG2000 standard published in "Information Technology—JPEG 2000 Image coding System—JPEG 2000 Committee Draft version 1.0, 9 Dec. 1999". However, other wavelet filters for performing the discrete wavelet transform may be used.

Figure 5:
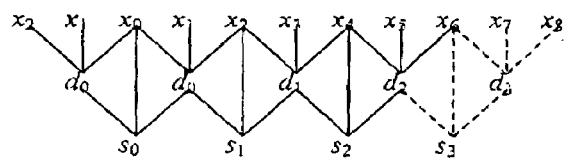
FIG. 5 shows a lifting lattice for a 5/3 wavelet filter during the column and row transformation for illustrating the first preferred embodiment.

The single level 5/3 filter reversible DWT of a one-dimensional signal x, as used in the draft JPEG standard, is defined by the lifting equations, $$d_n = x_{2n+1} - \left\lfloor \frac{x_{2n} + x_{2n+2}}{2} \right\rfloor \quad \text{Eqn (1)}$$

$$s_n = x_{2n} + \left\lfloor \frac{d_{n-1} + d_n + 2}{4} \right\rfloor$$

where $x_n$ is sample n of the input signal, $d_n$ is sample n of the output one-dimensional (1D) subband highpass signal, and $s_n$ is sample n of the output 1D lowpass subband signal. Unless otherwise indicated all indices are zero based. That is the first sample of each signal is sample 0. These equations, referred to as lifting equations, can be represented by a lifting lattice as illustrated in FIG. 5.

Figure 6:
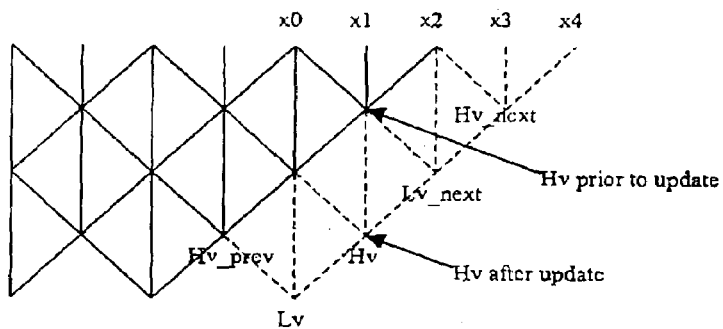
FIG. 6 shows a lifting lattice for the 9/7 wavelet filter during the column transformation for illustrating the second preferred embodiment.
Figure 7:
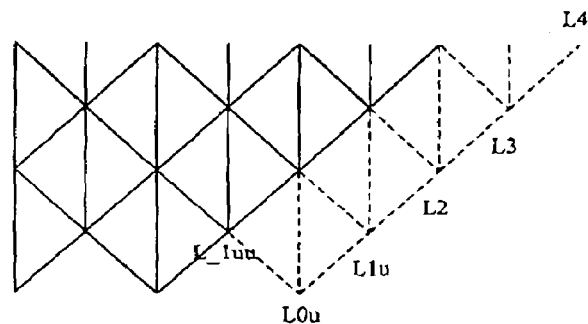
FIG. 7 shows a lifting lattice for the 9/7 wavelet filter during the row transformation for illustrating the second preferred embodiment.

The 9/7 filter DWT of a one-dimensional signal x, as used in the draft JPEG 2000 standard, is defined by the lifting equations, $$d'_n = x_{2n+1} + \alpha(x_{2n} + x_{2n+2})$$

$$s'_n = x_{2n} + \beta(d'_{n-1} + d'_n)$$

$$d_n = d'_n + \gamma(s'_n + s'_{n+1})$$

$$s_n = s'_n + \delta(s_{n-1} + d_n)$$

where $\alpha = -1.5861$, $\beta = -0.052980$, $\gamma = 0.88291$, $\epsilon = 0.44351$, $s_n$ and $d_n$ are coefficient n in the lowpass and highpass subband respectively, and $s'_n$ and $d'_n$ are intermediate values. These equations, referred to as lifting equations, can be represented by lifting lattices as shown in FIG. 6 and FIG. 7. Note that the outputs, $s_n$ and $d_n$ may also be scaled, but this is ignored here for the purposes of a simpler description.

For the purposes of this description, each equation, (there are 4 equations in Equation set (2) for example) is called a lifting step. Each lifting step is said to update a coefficient. For example, in the third equation in Equation set (2), the intermediate value $d'_n$ is updated to become $d_n$. A first coefficient that is updated to become a second coefficient is called a predecessor of the second coefficient. Thus for example, the intermediate lifting coefficient $d'_n$ is a predecessor of $d_n$. Also $x_{2n}$ is a predecessor of $s'_n$ and both $x_{2n}$ and $s'_n$ are predecessors of $s_n$. Similarly coefficients that are in the same horizontal position on the lattice (ie in a vertical line) are said to correspond to each other. Thus, for example, $x_{2n}$, $s'_n$ and $s_n$ all correspond to each other. As another example a predecessor corresponds to an updated version of itself and visa-versa.

The method in accordance with the first and second preferred embodiments generate a subband sample (in, n) for each of the 4 (two-dimensional DWT) output or subbands. Namely, each subband sample (m,n) comprises LL, HL, LH, and HH output coefficients. The method firstly undertakes a column analysis of the image in place. That is for each column, the coefficient $s_m$ replaces column sample 2m and $d_m$ replaces column sample 2m+1. Thus, in the resulting (partially transformed image) array, row 2m consists of lowpass 1D subband sample m for each column, while row 2m+1 consists of highpass 1D subband sample in for each column. The method then undertakes a row analysis of the row 2m. Output lowpass sample n, of this row, (the $s_n$ output for the row analysis) is sample (m, n) in the 2D DWT output LL subband. Similarly the output highpass sample n of this row analysis is sample (m, n) in the 2D DWT HL subband, Similarly for the analysis of row 2m+1, output lowpass sample n is sample (m, n) of the LH subband and output ass sample n is sample (m, n) in the HH subband.

The correspondence between input image samples and output subband samples is defined via the process of lifting, ie the updating of the coefficient. Subband coefficient (in, n) in the LL subband corresponds to input image sample (2m, 2n). Subband coefficient (m, n) in the HL subband corresponds to input image sample (2m, 2n+1). Subband coefficient (m, n) in the LH subband corresponds to input image sample (2m+1, 2n). Subband coefficient (m, n) in the HH subband corresponds to input image sample (2m+1, 2n+1). More generally (and slightly less specifically) the block of subband samples {(m, n):m=M,M+1, . . . M+P−1, n=N, N+1, . . . , N+Q−1} in each of the LL, HL, LH and HH subbands corresponds to the block on input image samples {(m, n):m=2M,2M+1, . . . 2M+2P−1, n=2N, 2N+1, 2N+2Q−1}. Such a block correspondence is illustrated in FIG. 9. The LL, HL, LH and HH subbands are tiled into 4 blocks as illustrated by the dotted lines in the right of FIG. 9. Corresponding to a block in each of these 4 subbands is a block in the input image. For example the top left block in each subband corresponds to the top left input image block and visa-versa. Further the top left block in each subband is spatially corresponding to the top left block in another subband in that they each correspond to the same input image block. A collection of spatially corresponding subband blocks (one block from each of output subbands) is termed a level block.

1.3 Performing a Two-Dimensional DWT of an Input Image

Figure 4:
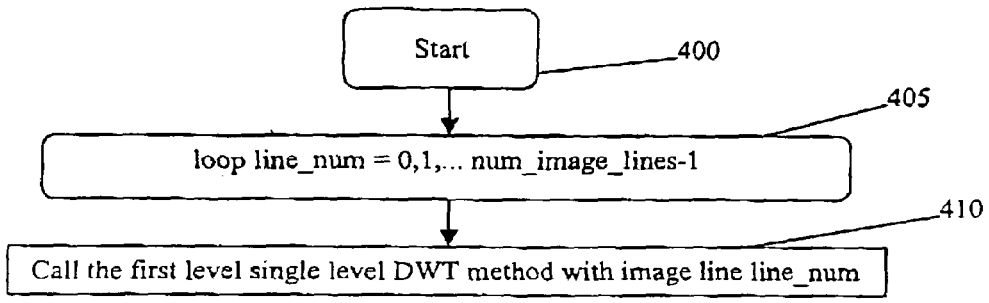
FIG. 4 is a flow diagram of a method of performing a two-dimensional discrete wavelet transform of a digital image in accordance with a first and second preferred embodiment.

Turning now to FIG. 4, there is shown a high level view of the preferred embodiment of a method for performing a two-dimensional discrete wavelet transform of a digital image. Processing commences in Step 400. In Step 405 an iterative loop is entered which increments a line counter line_num from 0 to num_image_lines−1, where num_image_lines is the number of lines (or rows) of the image. In Step 410 a first level single level DWT engine in the form of a sub-procedure is called inputting line line_num of the image. Thus the first level single level DWT engine is iteratively called inputting image lines.

In alternate embodiments several lines may be input at each call to the single level DWT engine. Further partial lines, or multiple partial lines may be input at each call. Colour images may also be analysed wherein an optional colour transform is employed upon the image data, before sending each component to a separate first level single level DWT engine.

In one preferred embodiment a one-dimensional 5/3 DWT is used in the 2D DWT, while in the second preferred embodiment a one-dimensional 9/7 DWT is used.

1.4 A Single Level (Two-Dimensional) DWT Engine

Turning now to FIG. 1, there is shown a flow diagram of a single level DWT engine (sub-procedure) for use in step 410 of the method shown in FIG. 4. The input to this engine is one line of an input image. The input image may actually be the image or image component to be compressed, in the case of a first level single level DWT engine method, or it may be the LL subband output from a another single level DWT engine. Each single level DWT engine is iterated (called again by the same or a similar engine method as that shown in FIG. 4), usually several times. For example, for the first level single level DWT engine is iterated as many times as there are input image lines, as was described with reference to FIG. 4. While processing commences in Step 105 and terminates in Step 165 for each iteration, a certain state is maintained between the iterations.

In Step 105 the input lines are stored in an input line buffer and the variable buffer_line_count updated. The variable buffer_line_count stores the number of (input) image lines in the input buffer. For an efficient implementation, methods that produce these input image lines and call this single level DWT engine write the input image lines directly to this input buffer, rather than pass the input image lines by data copying. After step 105, the sub-procedure proceeds to decision block 110.

In decision block 110, a check is made to determine if a next row of output subband blocks can be analysed. This is the case if buffer_line count >=num_lines_required. For the 5/3 filters, the variable num_lines_required=2H+1, while for the 9/7 the variable num_lines_required =2H+3, where 2H is the block height of the next row of blocks in the input image to be analysed and H is the block height of the corresponding blocks in the output subbands. For example, when the first line is input to the buffer there is not enough lines to be analysed and the single level DWT engine will return to the calling method of FIG. 4, where the single level DWT engine is called again and next line is input to the buffer, which now stores two lines. Again, there is not enough lines to be analysed and the single level DWT engine will return to the calling method of FIG. 4, where the single level DWT engine is called again and the next line is input to the buffer, which now stores three lines. This will continue until there are enough lines stored in the buffer for the next row of blocks to be analysed. Also if total_line_count=total_input lines, where total_line_count is a variable storing the count of the total number of lines that have been input to this single level DWT engine method so far, and total_input_lines is a variable storing the total number of lines in the image (the height of the image), then the next row of blocks can also be analysed as all remaining input image lines are available.

If neither condition in decision block 10 holds then this single level DWT engine method terminates in Step 165. This single level DWT engine method may recommence later, at Step 105, when another input image line is input. Alternatively processing continues in Step 115.

In decision block 115, a check is made to determine if total_line count=total_input_lines. If so processing continues at Step 120, otherwise processing continues at Step 125. In Step 120, the end of the input image columns are extended using a periodic symmetric extension. In the preferred embodiment this is achieved using line pointers, that point to the last rows of the input image. For the 9/7 filters 3 (or possibly 4) more lines are created, while for the 5/3 filters 1 (or possibly 2) such lines are created. The extension is described in the section herein entitled "1.8 Symmetric periodic extension and intermediate lifting coefficients update for edge blocks".

The height of the output subband block is checked in Step 125, and H set appropriately. Nominally H is fixed. However, for the last row of blocks in the output subbands, H may be smaller. Further, in alternate embodiments H may be varied at each iteration. In Step 130 the coefficients at the end of each input image line in the buffer is extended using a periodic symmetric extension. For the 9/7 filters each line is extended by 3 (or possibly 4) coefficients, while for the S/3 filters each line is extended by 1 (or possibly 2) coefficients.

In Step 135 the 2H (plus 1 for the 5/3 filters or 3 for the 9/7 filters) input image lines are processed, using vertical and horizontal lifting memory, stored in a vertical and horizontal lifting memory buffers respectively. This processing and vertical and horizontal lifting memories are described later with reference to FIG. 2 and FIG. 3. In Step 140 buffer_line_count is decremented by 2H, reflecting the fact that 2H lines have been processed Correspondingly the first 2H lines are discarded from the input image line buffer. A rotating buffer mechanism is preferably used so that the lines are not physically discarded, but merely overwritten by new lines that are input at a later iteration of this single level DWT engine.

In decision block 145 a check is made to determine if the output subbands are the highest level subbands to be produced if false the processing skips to decision block 155. Otherwise processing continues at Step 150. At Step 150, the single level DWT engine shown in FIG. 1 is called again for the next level with the newly generated output LL subband image lines as input. This next level single level DWT engine analyses the output LL subband to produce the next higher level DWT subbands.

In decision block 155, a check is made to determine if total_line_count=total_input_lines and buffer_line count>0. If this is true then all the input image lines have been input into this single level DWT engine, yet there remain lines to be processed. Thus this single level DWT engine method is called again in Step 160, noting that no new lines are input. Otherwise processing terminates in Step 165.

As mentioned above each single level DWT engine maintains a certain state between iterations. The input image line buffer and its state variables, buffer_line_count, total_line_count and total_input lines, are maintained between iterations. Further, the vertical lifting memory needed to analyse a next row of output subband blocks is maintained between iterations.

The input line buffer is preferably in the form of local memory and the image lines stored in the input line buffer are extracted from an external memory, which operates at a slower rate than the local memory. The input line buffer can be on the same chip as the DWT processor, and the pixels of the image stored in the external memory can be on another chip. Furthermore, vertical lifting memory data and horizontal lifting memory data necessary for the DWT can be buffered on local memory. The inverse DWT is performed in a complimentary fashion to the DWT. Namely, the iDWT input line buffer is preferably in local memory and stores lines of subband data, which are extracted from external memory, which operates at a slower rate, The iDWT input line buffer can be on the same chip as the iDWT processor and the subband data of the image stored in external memory can be on another chip. Furthermore, vertical lifting memory data and horizontal lifting memory data necessary for the iDWT can be buffered on local memory.

Figure 2:
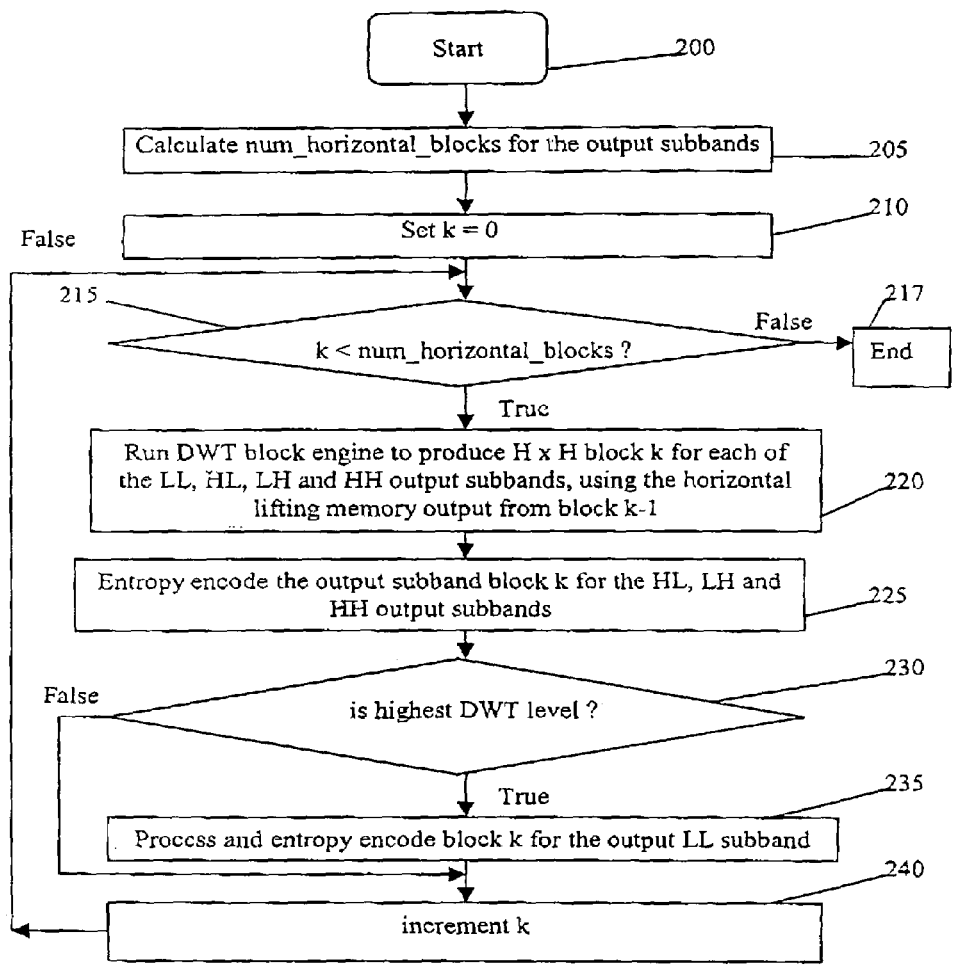
FIG. 2 is a flow diagram of a sub-procedure for generating a row of output subband blocks for use in step 135 of the single level DWT engine shown in FIG. 1 in accordance with the first and second preferred embodiment.

1.5 Processing 2H Input Image Lines Generating a Row of Output Subband Blocks Turning now to FIG. 2, there is shown a flow diagram of a sub-procedure for generating a row of output subband blocks for use in step 135 of the single level DWT engine shown in FIG. 1. The processing of the 2H input image lines commences at Step 200. In Step 205 the number of blocks in the horizontal direction for the output subbands, num_horizontal_blocks, is determined. For example if there are 4 blocks per row of blocks in each of the output subbands, then num_horizontal_blocks=4. In Step 210 a horizontal block index k is set to 0, the first block index The sub-procedure of FIG. 2 iterates over each block, k=0, 1, . . . num_horizontal_blocks−1. In decision block 215 a check is made to determine if k<num_horizontal_blocks. If true processing continues at Step 220. Otherwise processing terminates at Step 217. In this way the method for performing the 2-D DWT in accordance with the first and second preferred embodiments scan the blocks in a traditional raster order. In a variation on the present embodiments the blocks can be scanned in a raster order as described in the draft JPEG2000 standard published in "Information Technology—JPEG 2000 Image coding System—JPEG 2000 Committee Draft version 1.0, 9 Dec. 1999".

In Step 220 a DWT block engine is executed to produce block k, in the current row of blocks, for each of the output LL, HL, LH and HH subbands. A vertical and horizontal lifting memory is maintained between blocks and is used by the DWT block engine. The DWT block engine and this lifting memory is described later with reference to FIG. 3.

In Step 225 block k, in the current row of blocks, for each of the output HL, LH and HH subbands is quantized and entropy coded in turn. In alternate embodiments the quantization can be performed as part of the DWT block engine processing. In Step 230 a check is made to determine if the output subbands are the highest level subbands to be produced. If true processing continues in Step 235. Otherwise processing skips to Step 240. In Step 235 block k, in the current row of blocks, of the output LL subband is quantized and entropy encoded.

In Step 240 k is incremented and processing then continues for this next block, in the current row of blocks, in Step 215.

1.6 DWT Block Engine

Figure 3:
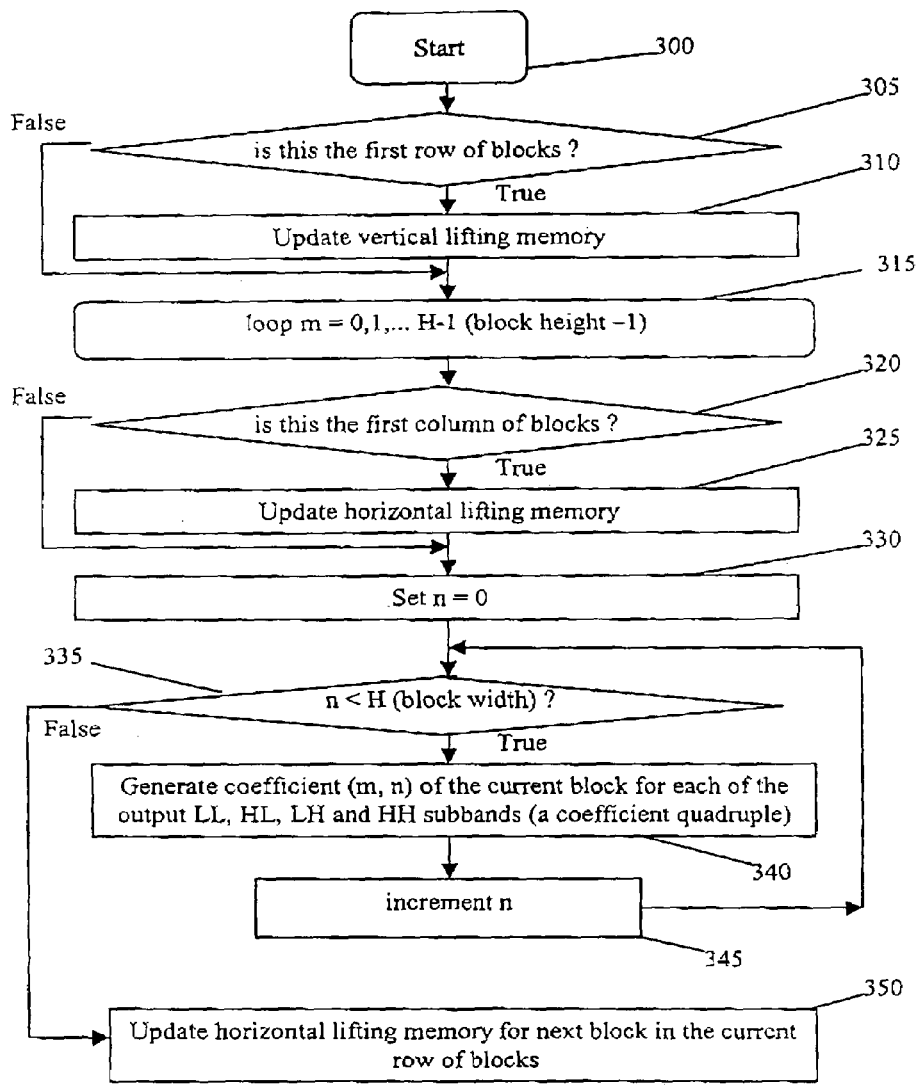
FIG. 3 is a flow diagram of a DWT block engine (sub-procedure) for use in step 220 of the sub-procedure shown in FIG. 2 in accordance with the first and second preferred embodiment.

Turning now to FIG. 3, there is shown a flow diagram of a DWT block engine (sub-procedure) for use in step 220 of the sub-procedure shown in FIG. 2. The processing of the DWT block engine commences at Step 300. Input to the DWT block engine process is a block of input image data (or pointers thereto), a vertical lifting memory data and a horizontal lifting memory data (or pointers thereto). In decision block 305 a check is made to determine if the output subband blocks to be analysed are in the first row of blocks in each subband. If true processing continues in Step 310. Otherwise processing skips to Step 315. In Step 310, the vertical lifting memory data is created to effect a periodic symmetric extension of the top of the columns of the input image. This process is described in more detail in the section entitled "1.8 Symmetric periodic extension and intermediate lifting coefficients update for edge blocks".

In Step 315, a loop is entered where an output block row index m is iterated from 0 to H−1. A check is made in decision block 320 to determine if the output subband blocks are in the first column of blocks in each subband. If true processing continues at Step 325. Otherwise processing skips to Step 330. In Step 325 the horizontal lifting memory data is created so as to effect a symmetric periodic extension of the start of the input image lines.

In Step 330 an output block column index, n, is initialised to 0. In decision block 335 a check is made to determine if n<H (H the output block width). If true processing continues at Step 340. Otherwise processing continues at Step 350.

At Step 340 coefficient (m, n) in the output subband blocks for each of the LL, HL, LH and HH subbands is generated. This analysis is described in more detail below with reference to each of a 5/3 and 9/7 filters using a lifting procedure. Step 340 also updates the intermediate lifting coefficients that are used to generate 2D output coefficients at later iterations (ie greater m or greater n). In Step 345 the column index n, is incremented.

At Step 350 the horizontal lifting memory data is updated, for use when the block in advance of the current block in the horizontal scan direction is processed (ie for when k in FIG. 2 is one greater than it currently is). According to the loop at Step 315 (FIG. 3), the block row index, m, is incremented and then if it is less than H, processing resumes at Step 320. Otherwise processing terminates.

The DWT block engine produces a block in each of the LL, HL, LH and HH subbands using a segmented DWT. The segmentation is in both dimensions, in that for both the horizontal and vertical directions not all the data is transformed. Further as described here, substantially only the necessary row and column data is transformed to generate the output subband blocks. A block of each of the LL, HL, LH and HH subbands is produced before any substantial row and column transformations of coefficients that generate a next block are performed. This DWT block engine thus acts as a one-pass transform at a block level.

1.7.1 Generating a LL, HL, LH and HH Subband Coefficient Quadruple for the 5/3 Filters The 2D DWT as described (partially thus far) with reference to FIG. 2 and FIG. 3 (The DWT block engine), performs the DWT at a block level in one-pass. However the DWT can be performed in a more local one-pass manner yet, whereby a given coefficient, say coefficient (m, n), in each of the 4 output subbands, is produced in before both the row analysis and column analysis required to produce a next coefficient in each of the 4 output subbands is completed. Furthermore, the DWT block engine produces the coefficients (m,n) in each of the four output subbands in place with minimal buffering.

The generation 340 (FIG. 3) of sample (m, n) in each of the LL, HL, LH and HH subbands, is now described with reference to the lifting equations, for the first preferred embodiment in accordance with a 5/3 filter.

For an understanding of the generating step 340, first consider a single level 1D analysis of the first column of an input image. For example, in FIG. 5 $x_n$ refers to sample n in the first column (column 0) of the image. Subband samples $s_3$ and $d_3$ can be determined from the "previous" highpass sample $d_2$, and input image (column 0) samples $x_6$, $x_7$ and $x_8$, as indicated by the dashed lines in FIG. 5. That is, $$d_3 = x_7 - \left\lfloor \frac{x_6 + x_8}{2} \right\rfloor \quad \text{Eqn (3)}$$

$$s_3 = x_6 + \left\lfloor \frac{d_2 + d_3 + 2}{4} \right\rfloor$$

More generally subband samples $s_n$ and $d_n$, can be calculated given input image samples $x_{2n}$, $x_{2n+1}$ and $x_{2n+2}$ and highpass subband sample $d_{n-1}$. For a given n, $d_{n-1}$ is termed the previous highpass subband sample.

Now consider a two dimensional (2D) DWT, and in particular the one dimensional (1D) column analysis of the (2D) DWT. Let each of L0, L1, and L2 represent 1D output subband coefficient $s_m$ in a column analysis of columns of spatial domain samples 2n, 2n+1 and 2n+2 respectively. (That is following an in-place column analysis, L0 is coefficient (2m,2n), L1 is coefficient (2m,2n+1) and L2 is coefficient (2m,2n+2)). Similarly let H0, H1 and H2 represent 1D output subband coefficient $h_m$ in the column analysis of columns 2n, 2n+1 and 2n+2. Also let x0[k], x1[k] and x2[k] be the samples 2m, 2m+1 and 2m+2 in image column k. Then from the lifting equations, $$H1 = x1[2n+1] - \left\lfloor \frac{x0[2n+1] + x2[2n+1]}{2} \right\rfloor, \quad \text{Eqn (4)}$$

$$L1 = x0[2n+1] + \left\lfloor \frac{Hv\_prev[2n+1] + H1 + 2}{4} \right\rfloor,$$

$$H2 = x1[2n+2] - \left\lfloor \frac{x0[2n+2] + x2[2n+2]}{2} \right\rfloor,$$

$$L2 = x0[2n+2] + \left\lfloor \frac{Hv\_prev[2n+2] + H2 + 2}{4} \right\rfloor$$

where Hv_prev[k] is 1D Output highpass subband coefficient $h_{m-1}$ in the column analysis of column k. The Hv_prev terms are stored in a vertical lifting memory buffer. In the preferred embodiment of the 5/3 filter DWT Hv_prev is a memory buffer for a whole input image row (noting that the rows are extended at the right hand end) of vertical lifting memory, and the DWT block engine only accesses the segment relevant to the current block. In alternate embodiments the physical vertical lifting memory used within the DWT block engine may be different from that used to pass vertical lifting data between blocks.

Now consider the horizontal transform of (in-place column transformed) rows 2m and 2m+1. For row 2m samples 2n, 2n+1 and 2n+2 are L0, L1 and L2 respectively. Thus, $$HL[m, n] = L1 - \left\lfloor \frac{L0 + L2}{2} \right\rfloor \quad \text{Eqn (5)}$$

$$LL[m, n] = L0 + \left\lfloor \frac{L\_1 + HL[m, n] + 2}{4} \right\rfloor$$

where L_1=HL[m, n−1]. Similarly, $$HH[m, n] = H1 - \left\lfloor \frac{H0 + H2}{2} \right\rfloor \quad \text{Eqn (6)}$$

$$LH[m, n] = H0 + \left\lfloor \frac{H\_1 + HH[m, n] + 2}{4} \right\rfloor$$

where H_1=HH[m, n−1].

The generation of sample (m, n) in each of the LL, HL, LH and HH subbands, is implemented in step 340 using these equations (4), (5), and (6).

Equations (4 to 6) are used to generate coefficient (m, n) in each of the 4 output subbands using input image samples, x0[2n+1], x0[2n+2], x1[2n+1], x1[2n+2], x2[2n+1], x2[2n+2] and intermediate lifting coefficients, Hv_prev[2n+1], Hv_prev[2n+2], and L0, L_1 and H0, H_1.

Regarding FIG. 3 (Steps 315-345), for a given block in each of the LL. HL, LH and HH subbands, coefficients are generated in "block raster" order. That is row 0 for the block is generated in order (that is coefficients (0,0), (0,1), (0,2), . . . , (0,H−1) in order) then row 1 (that is coefficients (1,0), (1,2), . . . (1,H−1) in order) and so on. In the inner loop (Steps 335-345 in FIG. 3) column index n is incremented from 0 to H−1, while in the outer loop (beginning at Step 315) the row index m (of a current block) is incremented from 0 to H−1. Note that the indices refer to the coefficients with respect to the top left corner of the block. This order is preferable for cache efficiency, as the input is accessed in row (two rows at a time) order, while the output is produced in row order.

In any given iteration equations (4) to (6) are used to generate a coefficient (m, n) of each of the four corresponding output subbands. The intermediate coefficient values, Hv_prev[2n+1], Hv_prev[2n+2], and L0, L_1 and H1, H0 required for each iteration are calculated prior to the iteration. Values L_1, L0 and H_1, H0, termed horizontal lifting memory data, are updated during the previous column iteration (iteration on n) Also, note that to generate coefficient (m, n+1) the required values L_1, L0 are given by the values HL[m, n], L2 respectively, which were created upon the generation of coefficient (m, n). Similarly to generate coefficient (m, n+1) the required values H_1, H0 are given by the values HH[m, n], H2 respectively, which were created upon the generation of coefficient (m, n). Thus the update $$L0=L2L\_1=HL[m,n]$$

$$H0=H2H\_1=HH[m,n] \quad (1)$$

is performed after equation (6) in preparation for the next column iteration (where n is incremented by 1).

Similarly that in the generation of coefficient (m+1, n), Hv_prev[2n+1] is given by the value H1 required in the generation of coefficient (m, n). (And similarly (Hv_prev[2n+2)) is given by H2) Thus after equation (4) the update, $$Hv\_prev[1]=H1 Hv\_prev[2]=H2 \quad \text{Eqn. (8)}$$

is performed in preparation for the next iteration of the outer loop (when m is incremented by 1).

In summary Step 340 in FIG. 3 is implemented by equations (4 to 8). This order of equations can be used, but others are possible, as long as the updates of the intermediate lifting coefficients are performed after the relevant values have been used For the (2D) loop of Step 315 in FIG. 3, for m>1 and n>1 the necessary intermediate coefficient values, Hv_prev[2n+1], Hv_prev[2n+2] (vertical lifting memory data), and L0, L_1 and H0, H1 (horizontal lifting memory data) have been generated at previous iterations of the loop. However, for n=0 (coefficients in the first column of the block), the necessary intermediate values L0, L_1 and H1, H0 are generated before entering the 2D loop for the current block. The horizontal lifting memory in Step 220 of FIG. 2 contains these L_1, L0 and H_1; H0 values for the first column of coefficients (that is for each of H rows there are is a corresponding L1, L0 and H1, H0 value in the horizontal lifting memory). If the current block does not abut the left hand edge of the subband to which it belongs then this lifting memory is updated during the processing of the block to the left of the current block at Step 350. of FIG. 3 (ie if the current block has index k in FIG. 2, then this lifting memory is updated when the block with index k-1 is processed in FIG. 2). If the block does abut the left hand edge (that is in the first column of blocks) then these values are created in Step 325 of FIG. 3. The values are set to give a net result of a symmetric periodic extension, as described in the section entitled "1.8 Symmetric periodic extension and intermediate lifting coefficients update for edge blocks".

For the first row of the loop at Step 315 in FIG. 3 the necessary vertical intermediate coefficient values are obtained from the vertical lifting memory buffer, and have been generated (by equation (8)) when the block immediately above the current block was processed. (See Step 135 in FIG. 1, and Step 220 in FIG. 2). For blocks that abut the top of the image subbands, then these intermediate values were generated in Step 310 of FIG. 315. In Step 310 these intermediate values were generated to give a net result of a symmetric periodic extension.

Some pseudo code for implementing equations 4 to 6 is as follows. The pseudo code assumes that the pixels are integral values. Furthermore, the blocks are intended to be scanned in a (raster) order as described in the draft JPEG2000 standard published in Information Technology—JPEG 2000 Image coding System—JPEG 2000 Committee Draft version 1.0, 9 Dec. 1999".

ROUND_HP=1

ROUND_LP=2

```
for (j = 0; j < (int) block_width << 1; j+= 2) {
    /*
    *First the vertical transform update steps — Equation 4
    */
    /* Highpass update for vertical transform */
    H1 = x1[j+1] + ((-x0[j+1] - x2[j+1] + ROUND_HP)>> 1);
    H2 = x1[j+2] + ((-x0[j+2] - x2[j+2] + ROUND_HP)>> 1);
    /* Lowpass update for vertical transform */
    L1 = x0[j+1] + ((int)(prev_H[j+1] + H1 + ROUND_LP) >> 2);
    L2 = x0[j+2] + ((int)(prev_H[j+2] + H2 + ROUND_LP) >> 2);
    /* Update vertical overlap for the next row (i←i+1) iteration) */
    /* Equation 6— vertical lifting memory update (may be for block below current block */
    prev_H[j+1] = H1;
    prev_H[j+2] = H2;
    /*
     * Then the vertical transform update — Equations (5) and (6)
     */
    /* Row transform the vertical lowpass coefficients */
    *HL = L1 = L1 + ((int)(-L0 - L2 + ROUND_HP)>> 1);
    HL += 4; //Jump to next column in scan, same scan row
    *LL++ = L0 + ((int)(L_1 + L1 + ROUND_LP) >> 2);
    L_1 = L1; // Update for next col iteration (j←j+2) — part of equation (6)
    L0 = L2;
    /* Row transform the vertical highpass coefficients */
    *HH = H1 = H1 + ((int)(-H0 - H2 + ROUND_HP)>> 1);
    HH += 4;
    *LH = H0 + ((int)(H_1 + H1 + ROUND_LP) >> 2);
    LH += 4;
    H_1 = H1; // Update for next iteration (j←j+2) — part of equation (6)
    H0 = H2;
}
```

C code implementing the above described 5/3 DWT block engine is given in the Appendix A entitled "C Code implementation of the 5/3 DWT block engine". The code assumes that the pixels are integral values. Furthermore, the blocks are scanned in a (raster) order as described in the draft JPEG2000 standard published in "Information Technology—JPEG 2000 Image coding System—JPEG 2000 Committee Draft version 1.0, 9 Dec. 1999".

1.7.2 The Inverse DWT: Generating A 2×2 Output Block of Coefficients from a LL, HL, LH And HH Subbands Coefficients Quadruplet for the 5/3 Filters The inverse DWT can utilise reversible 5/3 filters and be performed in a complimentary manner to that of the DWT in accordance with the first preferred embodiment. In particular, the inverse DWT similarly performs in a one pass manner at a block level and at a still more local level.

The generation of output coefficients (2m+1,2n+1), (2m+2, 2n+1), (2m+1, 2n+2), and (2m+2, 2n+2) (viz a 2×2 block of output coefficients) are produced at iteration of an inner loop of the decoding method from the sample subband coefficient (m+1,n+1) from each of the LL, HL, LH, and HH subbands and some buffered lifting memory. Namely, if x1 indicates row 2m+1 and x2 indicates row 2m+2 of the output image then output coefficients x2(2n+1], x1[2n+1], x2[2n+2] and x1[2n+2] are produced at each interation of an inner loop of the decoding method. Some pseudo code of such an inner loop is given below for the reversible 5/3 filters. The pseudo code assumes that the transform coefficients are integral values:

```
for (n = -1; n < (int) block_width-1; n++) {
    // Horizontal synthesis of LL and HL
    XL2 = LL[n+1] - ((HLcur + HL[n+1] + ROUND_LP) >> 2);
    XL1 = HLcur - ((-XL0 -XL2+ ROUND_HP) >> 1);
    HLcur = HL[n+1]; // Updates for next iteration across row (on n)
    XL0 = XL2:
    // Horizontal synthesis of LH and HH
    XH2 = LH[n+1 ] - ((HHcur + HH[n+1] + ROUND_LP) >> 2);
    XH1 = HHcur - ((-XH0 - XH2 + ROUND_HP) >> 1);
    HHcur = HH[n+1]; // Updates for next iteration across row (on n)
    XH0 = XH2;
    // Vertical synthesis of XL and XH, column2n+1
    x2[2*n+1] = XL1 - ((XHprev[2*n+1] + XH1 + ROUND_LP) >> 2);
    x1[2*n+1] = XHprev[2*n+1] - ((-XLprev[2*n+1] - x2[2*n+1] + ROUND_HP) >> 1);
    XHprev[2*n+1] = XH1; // Update for next iteration down column (on m)
    XLprev[2*n+1] = x2[2*n+1];
    // Vertical synthesis of XL and XH, column2n+2
    x2[2*n+2] = XL2 - ((XHprev[2*n+2] + XH2 + ROUND_LP) >> 2);
    x1[2*n+2] = XHprev[2*n+2] - ((-XLprev[2*n+2] - x2[2*n+2] + ROUND_HP) >> 1);
    XHprev[2*n+2] = XH2; // Update for next iteration down column (on m)
    XLprev[2*n+2] = x2[2*n+2];
}
```

The buffered lifting memory of the iDWT in a similar fashion to the DWT contains horizontal lifting memory data and vertical lifting memory data. The horizontal lifting data for 5/3 filter iDWT is contained in the variables XL0, HLcur, XH0, and HHcur of the above pseudo code. The horizontal lifting data is generated in the previous block adjacent to the current block in the same row. In alternative embodiments HLcur and HHcur need not be buffered as a lifting state, but can be retrieved from the HL and HH subband (block) buffers. The vertical lifting state is contained in the XHprev and XLprev variables. For each 2×2 block output there are 8 buffered lifting state memory variables. If HLcur and Hhcur are not used then only 6 can be used.

C code implementing the 5/3 inverse DWT block engine is given in the Appendix C entitled "C code implementation of the 5/3 inverse DWT block engine", The code assumes that the transform coefficients are integral values. Furthermore, the blocks are intended to be scanned in a (raster) order as described in the draft JPEG2000 standard published in "Information Technology—JPEG 2000 Image coding System—JPEG 2000 Committee Draft version 1.0, 9 Dec. 1999".

1.8 Symmetric Periodic Extension and Intermediate Lifting Coefficient Update for Edge Blocks The symmetric periodic extension of a finite discrete signal x, defined on an interval [0, N-1] (re)defines the signal on an extended interval [-$N_n$, N-1+$N_p$]. For odd length wavelet filters (ie the 5/3 and 9/7 filters) the extended values of x are given by, $$x_{-n}=x_n\ n=1, 2, \ldots N_n$$

$$x_{N-1+n}=x_{N-1-n}\ n=1, 2, \ldots N_p \qquad \text{Eqn. (9)}$$

This is illustrated in FIG. 5 for the 5/3 filters, for the lower signal boundary only, where the signal is extended two samples to the left of sample 0 ($N_n$=2) and the extended samples are equal to $x_2$ and $x_1$. From the figure it is evident that this extension leads to, $$s_0 = x_0 + \left\lfloor \frac{d_0 + d_0 + 2}{4} \right\rfloor \qquad \text{Eqn (10)}$$

Instead of actually extending the signal, setting the "previous" highpass sample to $d_0$(Hv_prev[k] is an example of such a previous highpass sample) gives the same result as if the signal was extended. Steps 310 and 325 update the intermediate lifting coefficients in this manner so that the resulting DWT analysis performed in Step 340 is equivalent to the analysis when a periodic symmetric extension is employed.

1.9 Generating a LL, HL, LH and HH Subband Coefficient Quadruple for the 9/7 Filters The generation 340 (FIG. 3) of sample (m, n) in each of the LL, HL, LH and HH subbands, is now described with reference to the lifting equations, for the second preferred embodiment which uses the 9/7 filters.

The 9/7 filter analysis is also performed in a local one-pass manner. For an understanding of the generation 340 of sample (m,n) using 9/7 filters first consider the column analysis. In a similar manner to the 5/3 let x0[k], x1[k], x2[k], x3[k] and x4[k] be input image samples 2m, 2m+1 and 2m+2 in image column k. By considering a fixed column, the column index k is dropped for x0 to x4, and for the variables used in the first part of this section, unless otherwise indicated. (Thus x0[k] becomes x0, x1[k] becomes x1 etc). Regarding FIG. 6 let Hv_prev, Lv, Hv, Lv_next and Hv_next, be 1D lifting coefficients or their predecessors that correspond respectively to the column samples 2m-1, 2m, 2m+1, 2m+2 and 2m+3. Thus for example, Lv is either (the column transform) output subband coefficient $s_m$, or its predecessor $s'_m$, and corresponds to column sample 2m. Also Lv_next is either $s'_{m+1}$ or its predecessor x2 (column sample 2m+2). Hv_prev, Lv, Hv, Lv_next and Hv_next refer to predecessor values (ie values at points above the dotted lines) prior to the set of lifting step updates indicated by the dotted lines in FIG. 6, and to the updated values following the set of lifting step updates. Thus for example, Lv refers to $s'_m$ before the lifting update, and $s_m$ after the lifting update. Note that Hv_prev is the same before and after the set of lifting updates indicated in FIG. 6.

Regarding FIG. 6, given intermediate values Lv and Hv, and the preceding highpass value Hv_prev, performing the lifting step updates as indicated by the dotted lines gives, $$Hv\_next=x3+\alpha(x2+x4)$$

$$Lv\_next=x2+\beta(Hv+Hv\_next)$$

$$Hv=Hv+\gamma(Lv+Lv\_next)$$

$$Lv=Lv+\gamma(Hv\_prev+Hv) \qquad \text{Eqn. (11)}$$

That is in addition to x2, x3 and x4, only the intermediate values Lv and Hv, and the preceding highpass value Hv_prev are required to produce the (column) subband output samples Lv and Hv ($s_m$ and $d_m$).

Note that for the next pair of output coefficients, when continuing in the vertical direction, (ie m is incremented by 1) the pre-update values of Hv_prev, Lv and Hv are the current Hv, Lv_next and Hv_next values respectively.

Now consider the horizontal transform of (in-place column transformed) row 2m. For this row label intermediate lifting coefficient samples 2n−1, 2n, 2n+1, 2n+2, 2n+3 and 2n+4 as L__1uu, L0u, L1u and L2, L3 and L4 respectively as shown in FIG. 7, in the same manner as used in FIG. 6. Thus L0u is the row (2m) output subband coefficient $s_n$, or its predecessor $s'_n$. Note that since the column transform has been done that LL[m, n]=(this) $s_n$. L__1uu is highpass coefficient output n−1 of the row transform (of row 2m), and is thus LH[m, n−1]. As with FIG. 6, the dotted lines indicate a set of lifting step updates, and that the indicated values refer to the values before or after the update as appropriate. Performing the indicated lifting update as, $$L3=L3+\alpha(L2+L4)$$

$$L2=L2+\beta(L1u+L3)$$

$$L1u=L1u+\gamma(L0u+L2)$$

$$L0u=L0u+\delta(L\_1uu+L1u) \quad \text{Eqn. (12)}$$

gives the current HL and LL subband output coefficients LH[m, n] L1u and LL[m, n]=L0u Thus from pre-update samples L__1uu, L0u, L1u, L2, L3 and L4 the current output subband coefficients are obtained. Further for the next coefficient in the horizontal direction (when n is incremented by 1) the pre-update values L__1uu, L0u, L1u and L2 are given by the current values LH[m, n], L2, L3 and L4 respectively The analysis of row 2m+1 is similarly performed. Labelling H__1uu, H0u, H1u, H2, H3 and H4 for intermediate lifting coefficient samples 2n−1, 2n, 2n+1, 2n+2, 2n+3 and 2n+4 in row 2m+1 respectively, in an analogous manner to that for as L__1uu, L0u, L1u and L2, L3 and L4 in FIG. 7, and performing the lifting updates, $$H3=H3+\alpha(H2+H4)$$

$$H2=H2+\beta(H1u+H3)$$

$$H1u=H1u+\gamma(H0u+H2)$$

$$H0u=H0u+\delta(H\_1uu+H1u) \quad \text{Eqn. (13)}$$

gives HL[m, n]=H0u and HH[m, n]=H1u, Thus from pre-update samples H__1uu, H0u, H1u, H2, H3 and H4 the current output subband coefficients are obtained. Further for the next coefficient in the horizontal direction (when n is incremented by 1) the pre-update values H__1uu, H0u, H1u and H2 are given by the current values HH[m, n], H2, H3 and H4 respectively.

Returning to the iterative loop over m and n in Steps 315 to 345 in FIG. 3. only pre-update values L3, L4 and H3, H4 are not generated at a previous iteration. In a similar manner to the 5/3 filters the other pre-update values L__1uu, L0u, L1u, L2 and H__1uu, H0u, H1u, H2, which are the horizontal lifting memory data values for the preferred embodiment of the 9/7 filter DWT, are set either at the previous column iteration (iteration on n), or in Step 350 (when the block to the left of the current block was generated) or in Step 325 (if the current block abuts the left hand edge of the image).

Thus at Step 340 only L3, H3, L4 and H4 need be generated before equations (11-13) are used to generate the current output subband coefficient quadruple.

Now reconsider equation (11) where each transform variable has a column index in order to differentiate different columns. Then for example Hv_prev, the 1D output subband coefficient $d_{m-1}$, for a given column, say column k, becomes Hv_prev[k]. Then L3=Lv[2n+3], L4=Lv[2n+4], H3=Hv[2n+3], and H4=Hv[2n+4]. In Step 340 equation (11) is used to generate the new L3 and H3 values (where the variables in equation (11) are indexed by column 2n+3), and then again to generate the new L4 and H4 values (where the variables in equation (11) are indexed by column 2n+4). Then equations (11 to 13) are used to generate the current output subband coefficient quadruple. The pre-update lifting coefficients are updated as well for the next iteration.

Hv_prev, Lv and Hv each are a row (of length equal to the extended input image rows) of vertical lifting memory, and collectively are the vertical lifting memory referred to in Step 135 in FIG. 1 and Step 310 in FIG. 3. Hv_prev, Lv and Hv are updated following the generation of L3 and L4 at each iteration (or possibly in Step 310 in FIG. 3), and are passed on from a current block so that the vertical analysis can be continued for the block below.

Some pseudo code for implementing equations 11 to 13 is as follows. The pseudo code assumes that the pixels are integral values. Furthermore, the blocks are intended to be scanned in a (raster) order as described in the draft JPEG2000 standard published in "Information Technology—JPEG 2000 Image coding System—JPEG 2000 Committee Draft version 1.0, 9 Dec. 1999".

ROUND_HP= 1

ROUND_LP= 2

ALPHA = −1.586134342f

BETA = −0.05298011854f

GAMMA = 0.8829110762f

DELTA = 0.4435068522f

NORM_K_OVER__2 = 0.61508705304018f

NORM__1_OVER_K = 0.81289306534524f

```
/* Loop in Steps 330-245. Do the 2D analysis of samples in
rows 2i and 2i+1.
   (j replaces 2n in this code) */
for (j = 0; j < (int) block_width << 1; j+= 2) {
   /* Step 340 */
   // Equation 11 for columns j+3 and j+4
   Hv_next3 = x3[j+3] + ALPHA * (x2[j+3] + x4[j+3]);
   Lv_next3 = x2[j+3] + BETA * (Hv[j+3] + Hv_next3);
   Hv_next4 = x3[j+4] + ALPHA * (x2[j+4] + x4[j+4]);
   H3 = Hv[j+3] + GAMMA * (Lv[j+3] + Lv_next3);
   L3 = Lv[j+3] + DELTA * (Hv_prev[j+3] + H3);
   L3 *= NORM__1_OVER_K; // Subband coefficients are
      scaled here
   Hv_prev[j+3] = H3;
   H3 *= NORM_K_OVER__2;
   Lv_next4 = x2[j+4] + BETA * (Hv[j+4] + Hv_next4);
   H4 = Hv[j+4] + GAMMA * (Lv[j+4] + Lv_next4);
   L4 = Lv[j+4] + DELTA * (Hv_prev[j+4] + H4);
   L4 *= NORM__1_OVER_K;
   Hv_prev[j+4] = H4;
   H4 *= NORM_K_OVER__2;
   /* Update vertical lifting memory data for the next row
      iteration (i←i+1)
      (and maybe for block below) */
   Lv[j+3] = Lv_next3;
```

```
Lv[j+4] = Lv_next4;
Hv[j+3] = Hv_next3;
Hv[j+4] = Hv_next4;
/* Equation 12 */
// Row transform the current lowpass row (input row 2i —
    pointed to by Lv)
L3 = L3 + ALPHA * (L2 + L4);
H3 = H3 + ALPHA * (H2 + H4); //Stick this in here for
    speed —(b/c of floating point
L2 = L2 + BETA * (L1u + L3); // multiplication latency)
L1u = L1u + GAMMA * (L0u + L2);
    *HL = (JCOEF_EC)(L1u * NORM_K_OVER_2 *
        scaleHL);
    HL += 4;
    H2 = H2 + BETA * (H1u + H3);
    *LL++ = (L0u + DELTA * (L__1uu + L1u)) * NORM_
        1_OVER_K;
    // Update local horizontal intermediate lifting coeffi-
        cients for next iteration (j←j+2)
    L__1uu = L1u;
    L0u = L2;
    L1u = L3;
    L2 = L4;
/* Equation 13 */
// Row transform the current highpass row (input row
    2i+1 — pointed to by Hv)
H1u = H1u + GAMMA *(H0u + H2);
    *HH = (JCOEF_EC)(H1u * NORM_K_OVER_2 *
        scaleHH);
    HH += 4
    *LH = (JCOEF_EC) ((H0u + DELTA * (H__1uu +
        H1u)) * NORM_1_OVER_K * scaleLH);
    LH += 4;
    // Update local horizontal intermediate lifting coeffi-
        cients for next iteration (i←j+2)
    H__1uu = H1u;
    H0u = H2;
    H1u = H3;
    H2= H4;
}
```

C code implementing the above described 9/7 DWT block engine is given in the Appendix B entitled "C Code implementation of the 9/7 DWT block engine". The code assumes that the pixels are integral values. Furthermore, the blocks are scanned in a (raster) order as described in the draft JPEG2000 standard published in "Information Technology—JPEG 2000 Image coding System—JPEG 2000 Committee Draft version 1.0, 9 Dec. 1999".

The inverse DWT can utilise reversible 9/7 filters and be performed in a complimentary manner to that of the DWT in accordance with the second preferred embodiment. In particular, the inverse DWT similarly performs in a one pass manner at a block level and at a still more local level.

2.0 Third Preferred Embodiment

2.1 Block Based Entropy Coding of DWT Subband Image Data

When entropy coding it is typically most efficient and convenient to fully entropy code a whole block of subband data. Similarly when entropy decoding it is convenient and efficient to entropy decode a whole block of data. That is a whole block of data is held in local memory during encoding or decoding, so that the processor requires minimal interaction with external memory, while executing these processes. The decoding method according to third preferred embodiment performs the iDWT at a block level in one pass in a similar fashion to the first and second embodiments. However, the decoding method of third embodiment performs the iDWT at a more local level in two pass as distinct from the first and second embodiments.

2.2 Correspondence between the Subband and Image Domain

Figure 10:
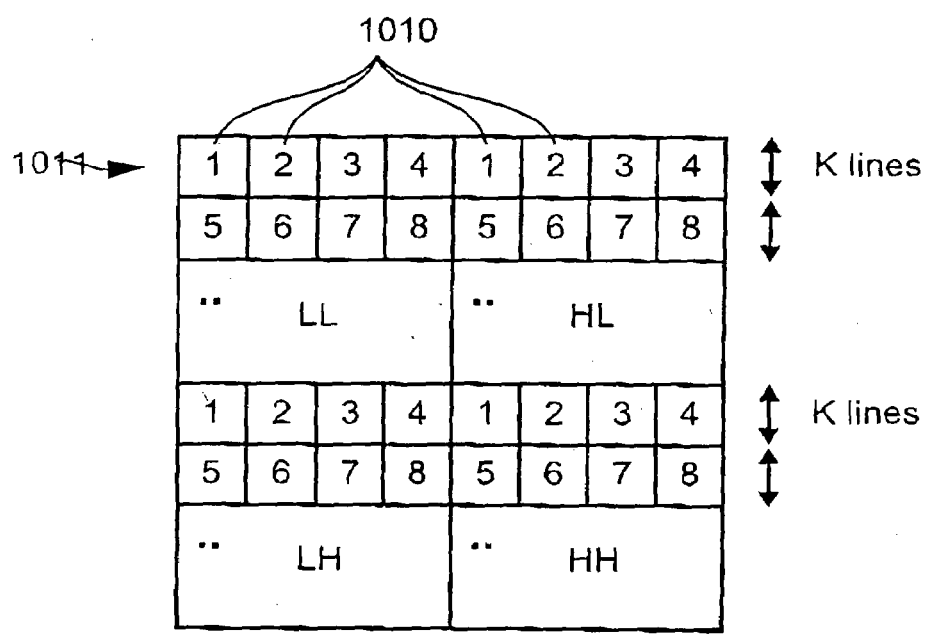
FIG. 10 illustrates a row of blocks in each subband of a DWT image according to a third preferred embodiment.

FIG. 10 illustrates a single level DWT of an image, and the tiling of each subband into K×K coefficient blocks 1000. In FIG. 10 there are four blocks per row of blocks in each subband meaning that there are 4K coefficients per row in each subband. The image upon which the DWT is performed can in fact be any array of samples, such as some intermediate LL subband, and is not necessarily an original (spatial domain) image. However, in order to differentiate the input and output of the single level DWT, the array of samples input to the single level DWT is referred to as the (input) image, while the output is referred to as a (single level) DWT image (which typically consists of four subbands). Each row 1011 of blocks of a subband in the DWT image, shown in FIG. 10, consists of K lines, where K is a positive integer value. Preferably, K is an integer value determining a preferred (or desired) block size for entropy coding. Corresponding to such a set of K lines are 2K lines of the original image. For example, in the case of Haar filters 2K lines can be used to generate the K subband lines, for each of the four subbands, and visa-versa, so that there is a one-to-one correspondence between one level and a next level. However, those skilled in the art will appreciate that for other (longer) filters a number of extra image lines may be required to generate the K subband lines at a next level of DWT decomposition. For example, in the case of 9/7 Daubechies filters, another seven lines of the input image, giving 2K+7 in total are required to produce K lines at a next level. In addition at synthesis extra subband lines, in addition to the K lines from each of the four subbands, are required to produce the 2K corresponding image lines of the previous level. For the 9/7 Daubechies filters the LL and HL subband require 3 extra subband lines, while the LH and HH require 4 extra subband lines. The correspondence and extra lines for the above filters required are further explained in the section herein entitled "2.7 Filter Alignment for the DWT and iDWT".

2.3 The Inverse One Dimensional DWT by Lifting

The one-dimensional DWT and iDWT can be implemented using a lifting scheme. The lifting scheme for an iDWT is described with reference to 9/7 Daubechies filters, however those skill in the art will appreciate that other filters can be used without departing from the scope and spirit of the invention. For instance, other filters include 5/3 filters, D4 Daubechies filters, D6 Daubechies filters, Gabor filters and Haar filters. Consider a signal x comprising samples $x_0$, $x_1$, $x_2$, . . . and the one dimensional DWT of this signal generating a lowpass signal s comprising samples (coefficients) $s_0$, $s_1$, $s_2$, . . . and a highpass signal d comprising samples (coefficients) $d_0$, $d_1$, $d_2$, . . . In this notation x is referred to as the image signal, and the s and d signals are referred to as subband signals. Using this notation the iDWT, that is, a DWT image can be inverted according to the following equations, $$s'_n = s_n - \delta(d_{n-1} d_n)$$

$$d'_n = d_n - \gamma(s'_n + s'_{n+1})$$

$$x_{2n} = s'_n - \beta(d'_{n-1} + d'_n)$$

$$x_{2n+1} = d'_n - \alpha(x_{2n} + x_{2n+2}) \quad (14)$$

where $\alpha=-1.5861$, $\beta=-0.052980$, $\gamma=0.88291$, $\delta=0.44351$ (these values corresponding to the 9/7 Daubechies filters). In addition, some scaling of the subband or output coefficients may be required depending on the scaling used for the forward transform.

Figure 11:
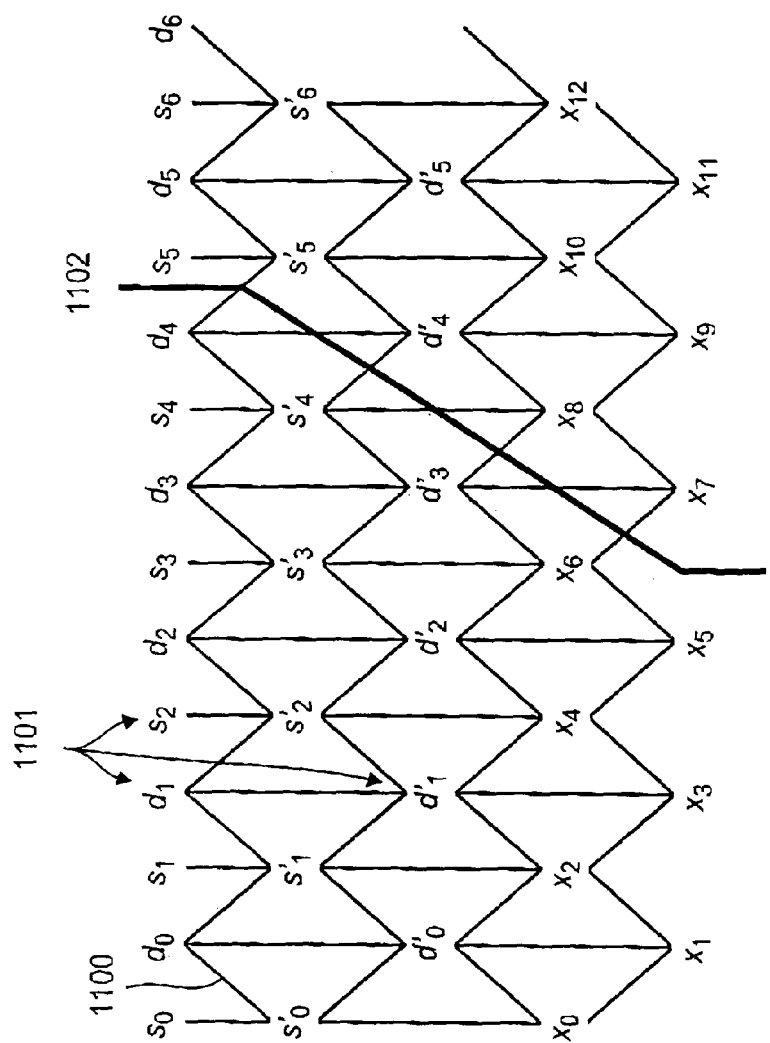
FIG. 11 is a lifting lattice for inverse DWT of 9/7 filters according to a third preferred embodiment.

FIG. 11 illustrates a lifting lattice in accordance with the implementation of equations (1). Each line 1100 between samples 1101 on the lattice represents a contribution of a sample at the top end of the line to a weighted sum forming a number at the bottom end of the line 1100. Thus, for example, since $d_0$, $s_1$ and $d_1$ are all connected to $s'_1$ by lines 1000, and $s'_1$ is at the bottom of each line 1100 we have that $s'_1$ is a weighted sum of $d_0$, $s_1$ and $d_1$. In particular, according to the lifting equation $s'_1 = s_1 - \delta(d_0 + d_1)$, and therefore lines 1100 joining $d_0$ and $d_1$ to $s'_1$ are weighted by $\delta=0.44351$ and $s_1$ by unity.

A brief explanation of the decoding method in accordance with the third preferred embodiment is made with reference to FIG. 11. The decoding method accesses a first segment of subband samples say $s_0$, $s_1$, $s_2$, $s_3$, $s_4$ and $d_0$, $d_1$, $d_2$, $d_3$, $d_4$. Corresponding to these 10 samples are the 10 first image samples $x_0, x_1, \ldots, x_9$. However the decoding method can only reconstruct the first seven samples $x_0, x_1, \ldots, x_6$. It cannot reconstruct the last three samples $x_7$, $x_8$, and $x_9$, without obtaining further subband samples.

At the same time as the decoding method obtains this first segment of subband samples and reconstructs the first 7 image samples, it also buffers the four intermediate subband coefficients $x_6$, $d'_3$, $s'_4$, and $d_4$. These are the coefficients immediately to the left of the heavy diagonal line 1102 in FIG. 11. Next, the decoding method retrieves a second segment of subband samples, say $s_5$, $s_6$, $s_7$, $s_8$, $s_9$ and $d_5$, $d_6$, $d_7$, $d_8$, $d_9$, and using the buffered data the decoding method can reconstruct the image samples $x_7$, $x_8$, and $x_9$, and also all the image samples, bar the last three, corresponding to these new subband samples. That is samples $x_{10}, x_{11}, \ldots, x_{16}$. As before last three samples $x_{17}$, $x_{18}$, and $x_{19}$ cannot be reconstructed without obtaining more subband samples. If the decoding method again buffers 4 intermediate subband samples and obtains a third segment of subband samples it can reconstruct another 10 subband samples and so on. Using this approach of buffering 4 intermediate subband samples, the decoding method can reconstruct a signal from sequential segments of subband samples. For each segment comprising n lowpass and n highpass samples, the decoding method can reconstruct 2n image samples. These are the 2n image samples corresponding to the n subband samples, bar the last three but also including the three samples prior to these 2n samples. For finite to length signals, for all but the first and last segment of n subband samples the decoding method is able reconstruct 2n image samples. For the first segment it reconstructs 2n-3, while for the last it reconstructs 2n+3. Using the usual symmetric boundary extension, the decoding method obtains the extra last three samples for last block.

These properties of the lifting lattice are used to facilitate the implementation of the line based inverse DWT in accordance with the third embodiment. Convolution techniques can also be used, however, a convolution implementation will typically require seven subband samples buffered between subband segments as opposed to 4 for a lifting scheme as described above.

For filters other than the 9/7 the same approach to reconstructing the signal from subband segments can be used. However more or less intermediate subband samples will need to be buffered depending on the lattice configuration (or filters).

Since a two-dimensional (single level) iDWT can be performed using a series of one dimensional inverse DWTs the two-dimensional iDWT can also be performed in segments. A special case of a two-dimensional segment of a two-dimensional subband is simply a block of subband samples. Thus the decoding method can perform a single level iDWT of 4 subbands by processing blocks of subband samples and buffering intermediate results between blocks.

2.4 Performing a Single Level Two-Dimensional IDWT on a Block by Block Basis Using Lifting The techniques described above with reference to FIG. 11 for performing a one-dimensional iDWT in segments can be used to perform a two-dimensional iDWT on a block by block basis (a block being the two-dimensional equivalent of a segment).

Figure 8:
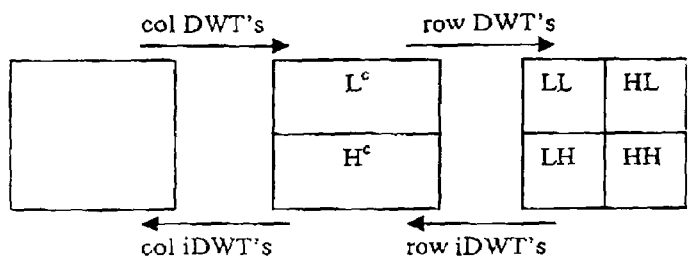
FIG. 8 illustrates a prior art process of performing a single level two-dimensional discrete wavelet transform of an image.

Turning to FIG. 10 and FIG. 8 consider the single level inverse DWT of a DWT image. Suppose the LL, HL and HH subbands are of size N×N. First the rows of the LL and HL subbands are synthesised to form an N×2N array of samples which comprise the lowpass (and decimated by 2) filtered columns of the original image. This array is labelled as $L^c$ in FIG. 8. Similarly the rows of the LH and HH subbands are synthesised to form another N×2N array of samples, which comprise the highpass (and decimated by 2) filtered columns of the original image, and is labelled $H^c$ in FIG. 8.

This row operation, as a series of one-dimensional iDWTs can be performed in segments, where the segments are say given by the block boundaries.

Figure 13:
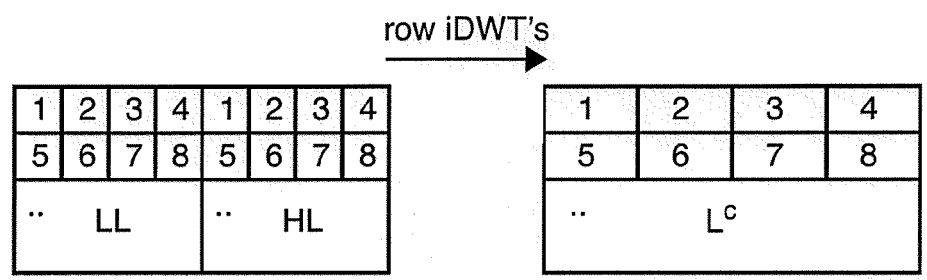
FIG. 13 shows a correspondence between blocks in the LL and HL subbands and the $L^c$ sub-image according to a third preferred embodiment.

Consider the row synthesis of the LL and HL subband to for the $L^c$ sub-image, as illustrated in FIG. 13. Corresponding to each block pair in the LL and HL subband is a block in the $L^c$ sub-image, which has the same number of rows as the corresponding LL (or HL) block, but has twice the number of columns. For the purposes of the inverse row transform LL subband contains the lowpass row data, while HL subband contains the highpass row data. Corresponding blocks in each of these subbands contain the corresponding lowpass and highpass data.

First consider block 1 in the LL and HL subbands. Each block consists of K rows by K columns of data. The decoding method inverse transform each row these blocks outputting 2K−3 synthesised samples per row, and buffering 4 intermediate subband samples, per row. These 2K−3 samples per row are the first 2K−3 samples per row of block 1 of the $L^c$ sub-image. The last 3 row synthesised samples per row, being the last three samples in each row in block 1 of the $L^c$ sub-image, cannot be reconstructed until we obtain more subband data (ie from block 2). Thus the decoding method has reconstructed all but the last three columns of block 1 of the $L^c$ sub-image. Then the decoding method can inverse transform the K rows of block 2 (from the LL and HL subband) and, using the 4 buffered subband samples per row from block 1, generate the next 2K samples of each synthesised row data That is the last 3 synthesised samples of each row of block 1 of the $L^c$ sub-image and the first 2K−3 samples of each row of block 2 of the $L^c$ sub-image. Hence the decoding method has now completed the reconstruction of block 1 of the $L^c$ sub-image and reconstructed all but the last three columns of block 2 of the $L^c$ sub-image. The decoding method can similarly process block 3. Finally the decoding method can process block 4. For this block the decoding method can not only complete the reconstruction of block 3 of the $L^c$ sub-image but also of block 4 of the $L_c$ sub-image. The last 3 synthesised samples of block 4 of the $L^c$ sub-image for each row can be reconstructed using the symmetric boundary extension conditions. Thus for the block 4 we synthesise 2K+3 samples per row.

The decoding method can similarly process the LH and HH subbands in block row order to produce the $H^c$ sub-image.

Figure 14:
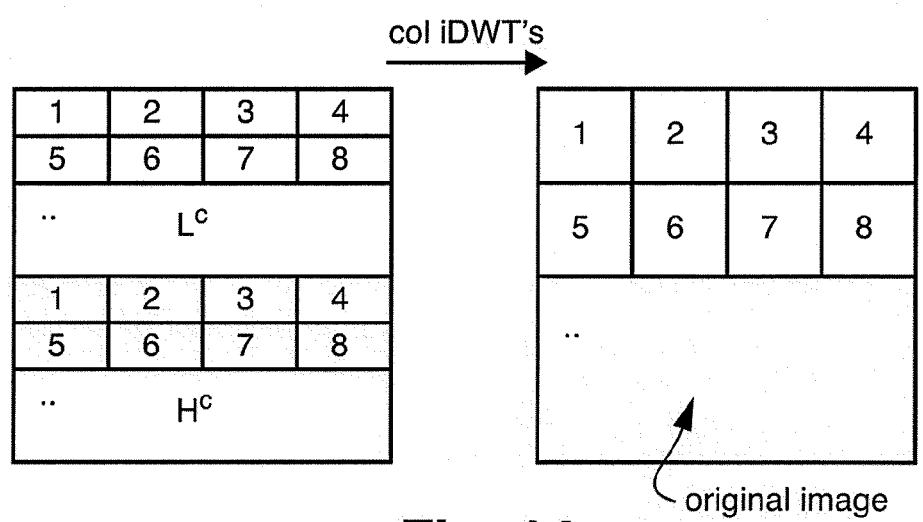
FIG. 14 shows a correspondence between blocks in the $L^c$ sub-image and $H^c$ sub-image and the original image according to a third preferred embodiment.

Corresponding to each pair of blocks in the $L^c$ and $H^c$ sub-images is a 2K×2K block in the original image, as illustrated in FIG. 14.

The decoding method having performed the row synthesis for the LL and HL subbands of block 1 results in all but the last three columns of block 1 of the $L^c$ sub-image. Similarly processing block 1 for the LH and HH subbands gives all but the last three columns of block 1 of the $H^c$ sub-image. Thus the decoding method at this stage results in the first 2K−3 columns of block 1 of the $L^c$ and $H^c$ sub-image. During the next stage, the decoding method can process column 1 of block 1 of $L^c$ sub-image and of block 1 of the $H^c$ sub-image to generate all but the last three samples of column 1 of block 1 of the original image. The decoding method can similarly process columns 2, 3, . . . , 2K−3 of these blocks. Thus during this stage, the decoding method can generate the top left hand 2K−3×2K−3 samples of block 1 of the original image. The decoding method also buffers the 4 intermediate subband samples for each column for use when the decoding method processes block 5.

The decoding method then processes the rows of block 2 of the LL and HL subbands and the rows of block 2 of the LH and HH subbands, and using the buffered intermediate subband data from block 1, reconstruct the last three columns of block 1 and the first 2K−3 columns of block 2 of the of $L^c$ and $H^c$ sub-image. The decoding method can then process these 2K columns to generate the top left hand 2K−3×2K−3 samples of block 2 of the original image, and also the right hand 2K−3×3 sub-block of block 1 of the original image. The decoding method also buffers the 4 intermediate subband samples for each of the 2K columns. At this stage, the decoding method has then reconstructed the first 4K−3 samples for the first 2K−3 rows of the original image. The decoding method can similarly process blocks 3 and 4, giving all of the first 2K−3 rows of the original image.

Next the decoding method processes the second row of blocks in a similar fashion. For block 5, the decoding method synthesises the rows as above. When the decoding method synthesises the columns it uses the buffered column overlap data to reconstruct the last three rows of block 1 in the original image as well as the first 2K−3 rows of block 2 of the original image (baring the last three columns as usual). Similarly for blocks 6 and 7 it also reconstructs the last 3 rows of blocks 2 and 3 for the original image as well as the first 2K−3 of block 6 and 7 of the original image. For block 8, the decoding method can reconstruct all the row data, and thus reconstruct a 2K×(2K+3) block. The decoding method similarly processes all the blocks in DWT subbands.

2.5 Decoding an Image with a Line Based Inverse DWT

To perform the inverse DWT with a relatively small number of transactions between local and external memory (per output image sample) a special form of a line based inverse DWT can be used.

Preferably, the blocks of each subband of a DWT image have been entropy coded, where the block size is fixed across all subbands and each block consists of has K rows of data, For situations where variable block sizes are used, preferably K is the number of rows of the block with the most number of rows (or possibly the least common multiple of the number of rows in each block). Preferably, also square blocks are used so that the block dimensions are K×K. However, rectangular blocks can also be used without departing from the spirit and scope of the invention.

Preferably, the decoding method uses an external memory buffer of 3K lines for each intermediate LL subband. That is for a J level DWT, the decoding method uses LL1, LL2, . . . and LL(J−1) buffers, each having 3K lines, where the line length is the length of the LLj subband. Further for each level, the decoding method uses a 4 line buffer which is referred to herein as the col_overlap buffer. The line length for this buffer is the length the LL subband lines at the next lower level. Thus the col_overlap buffer for level 1 has a line length the same as the line length of the output image.

Preferably, the decoding method uses 4 internal memory buffers each of size K×K which are referred to herein to as LL, HL, LH and HH block buffers. There are two additional internal memory buffers. One comprising 4 columns by 2K rows, which is referred to herein as row overlap buffer and one comprising 4 rows by 2+3 columns which is referred to herein as the col_overlap (internal) buffer.

For some applications, depending on the image line length, it may be possible that the external col_overlap buffer is a local memory buffer. In this case the internal col_overlap buffer is not needed. Further, for a general purpose computer these buffers may not explicitly be designated as external or internal. The idea is that data held in internal buffers is held in the processor cache, and hence is accessible more quickly than data in external memory. In this way some buffers may operate as external and internal buffers at different times.

The decoding method in accordance with third embodiment is based around a single level two-dimensional iDWT engine that processes nominally K subband lines, for each of the four subbands at level j, and produces nominally 2K lines of LL(j−1) data. As explained above the correspondence between these input K subband lines and output 2K lines is not exact. However, by maintaining some overlapping data we can usually produce 2K LL(j−1) subband lines for K lines input for each of the level j subbands.

Figure 12:
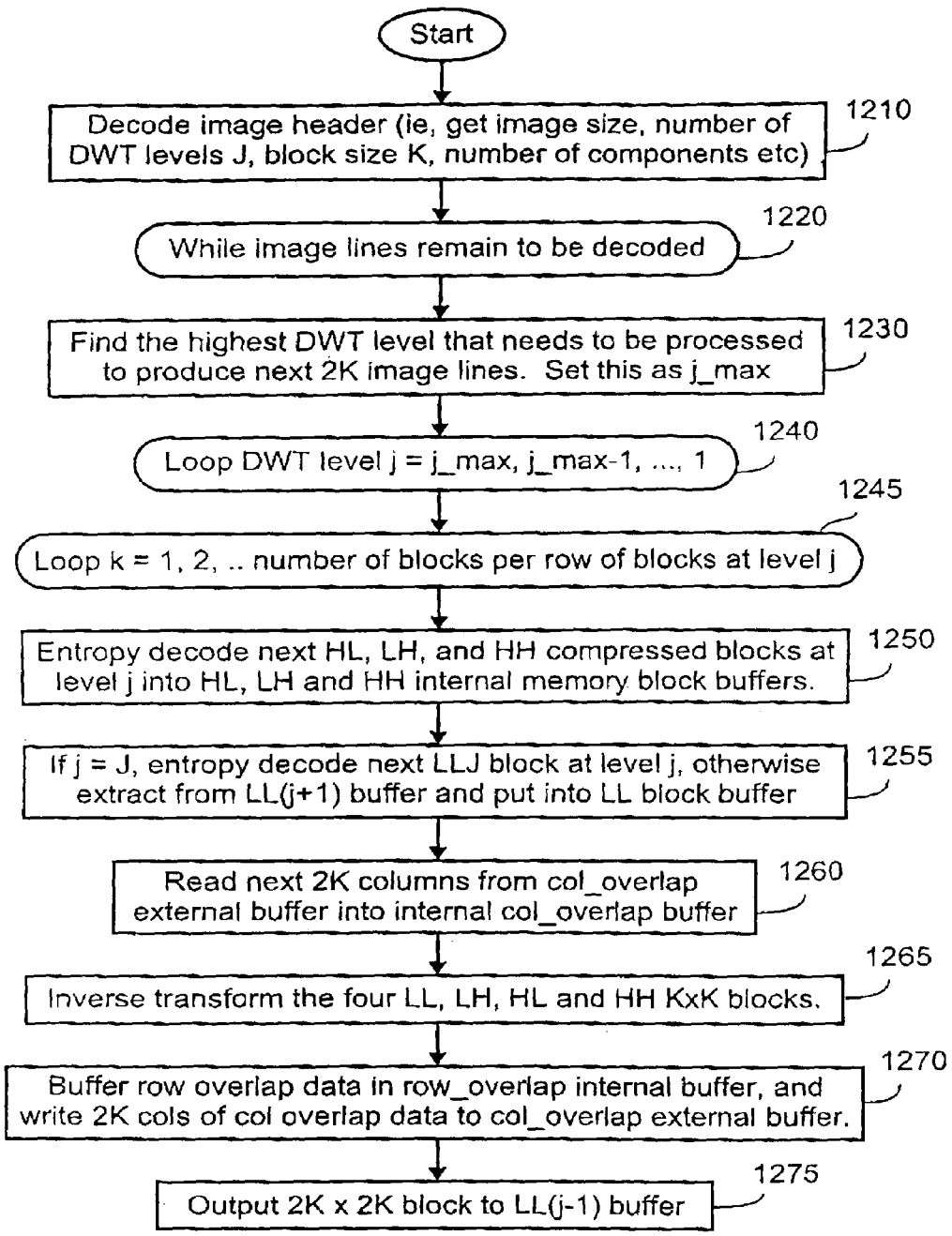
FIG. 12 is a flow-chart of a K-Line based implementation of the iDWT according to a third preferred embodiment.

Turning to FIG. 12, the decoding method in accordance with the third embodiment begins at Step 1210 by decoding the compressed image header. From the header, image information such as size, number of DWT levels employed, and entropy coding block size are determined.

At step 1220 a loop is entered that terminates when there are no more image lines to decode. Normally 2K image lines are decoded and output per iteration. For the first iteration only 2K−3 lines are decoded and for the last iteration up to 2K+3 lines are decoded. To obtain 2K image lines we need (at least) K lines for each of the level one subbands. The K lines for the AC subbands can be obtained by decoding the appropriate row of blocks in each AC subband. But the decoding method still need K lines from the LL1 subband. If the LL1 buffer has less than K lines in it the decoding method needs to process the level three subbands, with the single level iDWT engine, to fill the LL1 buffer with more lines, which in turn requires that the LL2 buffer has at least K lines in it. If this is not the case, the decoding method needs to process K lines of the level 3 with the single level iDWT engine subbands and so on. Step 1230 then determines the highest such DWT level needed to be processed. Given a J level DWT, j_max is the smallest integer less than or equal to J such that the LL1, LL2, . . . , LL(j_max−1) buffers each have less than K lines of data in them, while LL(j_max) has at least K lines in it. If all the LL buffers have less than K lines in them then j_max is J, as is the case for the first iteration.

At step 1240 a loop is entered that iterates from j=j_max to j=1, decrementing j by one at each iteration. At each iteration the decoding method processes, with the single level iDWT engine, substantially K lines of each of the four subbands at level j producing nominally 2K lines of the LL(j−1) subband. The K lines the decoding method processes are the K lines in the first unprocessed row of blocks in the level j subbands. In other words for a given level j each time this loop is entered the decoding method processes the next row of blocks.

At step 1245 a loop is entered that iterates over the number of blocks per row of blocks for the subbands at level j. At step 1250 block k in the current row of blocks is decoded for each of the HL, LH and HH subbands and the data placed in the (K×K) HL, LH and HH local memory buffers. At step 1255 the corresponding (K×K) block of LL data is put into the LL local memory buffer either by decoding block k in the current row of blocks in the LLJ subband (in the case that j=J), or by reading the data from the LLj external memory buffer. At Step 1255 the next 2K columns are read from the external col_overlap buffer into the internal col_overlap buffer. At Step 1265 the four block buffers, LL, HL, LH and HH, and the row and col overlap internal buffers are then inverse transformed with a partial single level iDWT to produce nominally a 2K×2K output block of coefficients at level j−1.

At Step 1270 the intermediate row subband data needed for the next block in the current row of blocks is buffered in the internal row_overlap buffer. Similarly the intermediate column data that is needed for inverse transforming the block immediately below the current block in each subband is buffered in the col_overlap external buffer. At Step 1275 the nominally 2K×2K output data block is written to the LL(j−1) buffer.

2.6 Minimum Bit Stream Latency for the Decoder

For some decoding systems it is desirable to buffer as little of the compressed bit stream as possible. By rearranging the order in which the code for each subband block appears in the compressed bit stream it is possible to minimise the buffering requirements for a decoder.

The decoding method of the present embodiment outlined in the Section entitled "Decoding an image with a line based inverse DWT" specifies an ordering of the subband blocks. The ordering is given by the order in which each block is decoded. By arranging the compressed bit stream so that the code for each block occurs in the specified order means that only a small part of the compressed bit stream needs to be buffered by the decoder. A server can supply the necessary portions of the bit stream as required by the decoder, in the given order. The server, as herein described, is intended to be a system or device which supplies a bit stream to a decoder. For example, a server can be a chip or electronic circuit which supplies a decoder with a bit stream; a first general-purpose computer which supplies, across a network connection, a bit stream to a second general purpose computer performing the decoding (i.e. decoder).

According to the above described method at any given level the corresponding HL, LH and HH (and LL for level j) blocks are decoded together (or one after the other). Thus the corresponding blocks for different subbands at the same level should be interleaved in the bit stream. Also a row of blocks for each of the three subbands at the given level (or four for level J) is decoded in block row order. Thus the blocks for a given row in a level should appear sequentially (and interleaved across subbands in the given level) in the bit stream. The only ordering remaining is the ordering of the levels interleaving the block rows. This is again specified by the above described method.

Following the decode sequence above we can define the following order. The first part of the bit stream contains the first row of row of blocks at level J, then the first row of blocks at level J−1, then level J−2 and so up to an including the level 1 blocks. Within a row of blocks the order is block raster scan order with the corresponding blocks for the LL (only at level J) HL, LH and HH subband stored together. That is block 1 for the LL, HL, HL and HH subbands at level J are stored at the head of the bit stream, followed by block 2 for each of these subbands, then block 3 and so on. The next part of the bit stream then contains the second row of blocks for each level, level J, J−1, . . . , 1 in this order. Then follows the third row for level 1, the third row for level 2, the forth then fifth row for level 1, the third row for level 3, the forth row for level 2, and the sixth and seventh row for level 1 and so on. A procedure for generating the block order can be used that follows the flow diagram of FIG. 12, but does not actually perform any of the decoding and inverse transform operations. The ordering then depends on the number of DWT levels J, the block height K and the height of the image (subbands).

An example of some pseudo-code that determines the level ordering is given by function [level_order, iterations] = test_order(im_size, J, K);
    %function [level_order, iterations] = test_order(im_size, J, K);
    line_count = zeros(J+1, 1); %Subband line count for each level (j=0, 1, . . . , J);
    iterations = zeros(J+1, 1); %Number of block rows "decoded" for each level
    %or a count of the number of times each the single level DWT level engine has
    %been run on each level
    max_iterations = ceil(im_size ./ (K*(2 .^ (0:J)))); %Max iterations for each level
    index = 1; %output level order index
    %Loop while output image lines remain to be decoded
    while (line_count(0+1) < im_size)
        %Find j_max. The highest level needed to produce another 2K image lines
        j_max = 1;
        while ((line_count(j_max+1) < K) & (j_max < J) & (iterations((j_max+1)+1) < max_iterations(j_max+1)+1)))
            j_max = j_max+1;
    end
    if j_max == J
        line_count(j_max+1) = line_count(j_max+1)+K;
    end
    %Loop through the levels from j_max to 1 decrementing j at each iteration
    for j = j_max:−1:1
        %Next row of blocks to be processed is at level j
        level_order(index) = j;

```
    index = index + 1;
    %increment row of blocks counter for current level
        iterations(j+1) = iterations(j+1) + 1;
        %Remove K lines from LLj buffer, as these have
            been "processed"
        line_count(j+1) = line_count(j+1) − K;
        %Add the new 2K lines just generated to LL(j−1)
            buffer
        line_count(j−1)+1) = line_count(j−1)+1) + 2*K;
        %Adjust line_count at level j−1 depending on start
            and end conditions
        if (iterations(j+1) == 1)
            line_count((j−1)+1) = line_count(j−1)+1) − 3;
        elseif (iterations(j+1) == max_iterations(j+1))
            line_count((j−1)+1) = line_count((j−1)+1) + 3;
        end
    end
end
```

Thus, the server parses a first bit stream, identifying blocks that are to be re-ordered and re-orders the blocks in to a second bit stream arranged for the decoder and the decoding technique described with reference to FIG. 12

2.7 Filter Alignment for the DWT and iDWT

2.7.1 Alignment of the Analysis Filters

The lowpass and highpass subbands are generated according to the following equations, $$v_0[n] = \sum_k x[2n-k]h_0[k], v_1[n] = \sum_k x[2n-k]h_1[k] \qquad (15)$$

where $h_0$ and $h_1$ are the lowpass and highpass filters respectively, $v_0$ and $v_1$ are the lowpass and highpass subband respectively, and x is the input signal. For odd length symmetric filters the filter coefficients are chosen so that $$h_0[-n]=h_0[n], h_1[-n-1]=h_1[n-1],$$

$$h_0[-n]=h_0[-n], \qquad (16)$$

That is the lowpass filter, $h_0$, is centred at filter tap $h_0[0]$, while the highpass filter is centred at filter tap $h_1[-1]$. We say that the lowpass filter is centred at filter time 0, while the highpass is centred at filter time −1.

Figure 15:
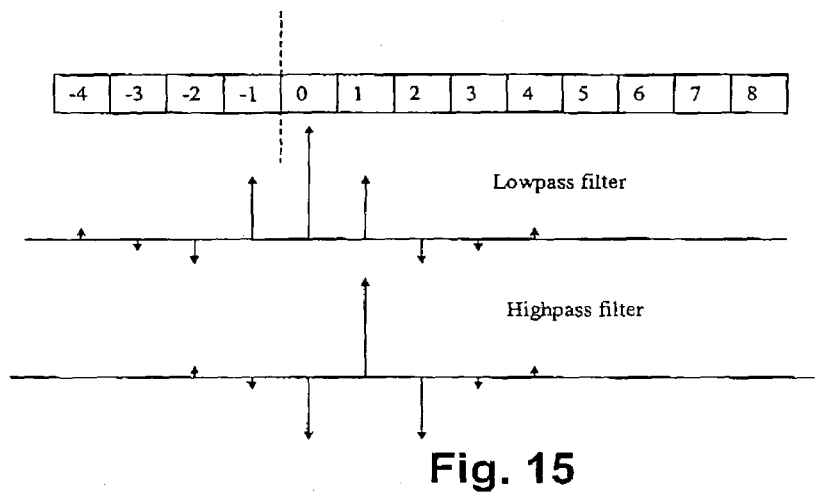
FIG. 15 illustrates an initial alignment of lowpass and highpass analysis filters for the 9/7 filters for use in the third preferred embodiment.

Turning now to FIG. 15, there is shown an initial alignment of lowpass and highpass analysis filters for the 9/7 filters. The lowpass filter centre tap is aligned with the input sample 0 while the highpass filter centre tap is aligned with the input sample 1. In terms of the generation of the first (or better $0^{th}$) lowpass and highpass subband samples the lowpass and highpass filters are aligned as shown in FIG. 15, for the 9/7 filters. In this FIG. 15, the filter coefficients are multiplied by the signal samples that are aligned in time to give the first lowpass subband output. Note that the lowpass centre tap multiplies the $0^{th}$ input signal sample, while the highpass centre tap multiplies the $1^{st}$ input signal sample, commensurate with equations (15) and (16). Subsequent subband output coefficients are generated by moving the filters two samples to the right at a time, element wise multiplying the filter taps with corresponding signal samples and summing the results.

With this filter alignment the filtering process is (close to) zero-delay. That is the subband samples at time n correspond to the subband components of the signal at times 2n and 2n+1. (The factor of 2 follows from the decimation by 2). If sample 0 is really the start of the signal the samples at times −1, −2 etc are generated usually by a symmetric boundary extension. However, in this FIG. 15 sample 0 could refer to any even numbered signal sample, and the previous samples are then simply the samples immediately preceding this sample.

From FIG. 15, it can be seen that the four samples preceding sample 0 are required (for the lowpass filter) to generate the first subband output coefficient. This is also evident from equation (15), where the support of the lowpass filter is from k=−4, −3, . . . , 4, for the 9 tap filter. That is $h_0[k]=0$ if k<−4 or k>4. Similarly the support of the 7-tap highpass filter $h_1$ is k=−4, −3, . . . , 2.

Figure 16:
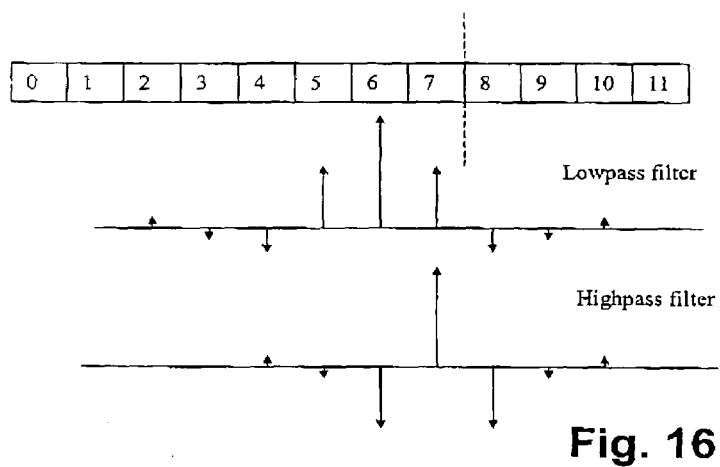
FIG. 16 illustrates an alignment of filters after filtering an even number of samples for use in the third preferred embodiment.

Turning now to FIG. 16, there is illustrated the alignment of synthesis filters after filtering an even number of samples. This shows the alignment of the filters, to generate the last output sample, for filtering an even number of samples, namely 8. The lowpass filter centre tap is aligned with the second to last sample (sample 6), while the highpass filter centre tap is aligned with the last sample (sample 7), commensurate with the alignment at the start of filtering. From FIG. 16, it can be seen that 3 samples after the last sample are required to generate these output subband coefficients. This can also be derived from equation (15).

With this initial filter alignment we can equate sample n in the lowpass and highpass subbands with samples 2n and 2n+1 in the input signal. To generate sample n in the lowpass subband we need the 4 samples preceding sample 2n, namely samples 2n−1, 2n−2, 2n−3 and 2n−4, (samples 2n and 2n+1 and,) and the 3 samples following sample 2n+1, namely samples 2n+2, 2n+3, 2n+4. These samples are also (more than) sufficient to form sample n in the highpass subband. Thus for each block of 2 samples in the input signal we need the 4 preceding input samples and 3 following samples to form the corresponding subband samples. More generally for a segment of 2K samples in the input signal, assuming the first sample in the segment is at an even (time) index, we need the 4 samples preceding the segment and the three samples following the segment to form the corresponding K lowpass and K highpass subband samples. This gives 2K+7 input signal samples.

2.7.2 Alignment of the Synthesis Filters

For perfect reconstruction at the output, without any delay, (that is the signal output from the synthesis or inverse DWT is the same as the signal input to the analysis or forward DWT), the synthesis filters are given by (the aliasing cancellation equations), $$g_0[n]=(-1)^n h_1[n-1], g_1[n]=-(-1)^n h_0[n-1] \qquad \text{Eqn (17)}$$

where $g_0$ and $g_1$ are the lowpass and highpass synthesis filters respectively. Since $g_0[0]=h_1[-1]$ the centre tap of the lowpass synthesis filter is $g_0[0]$. Similarly, since $g_1[1]=h_0[0]$, the centre tap of the highpass synthesis filter is $g_1[1]$. This gives the filter alignment as shown in FIG. 17 to generate the first synthesis output sample.

Figure 17:
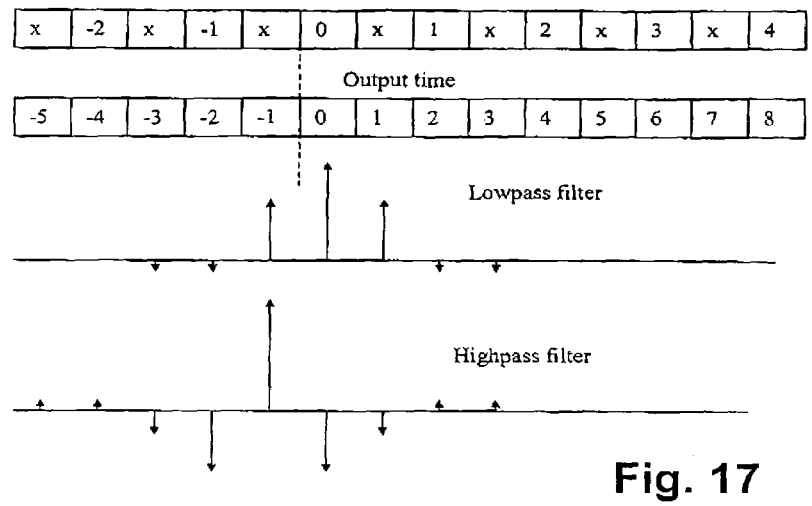
FIG. 17 illustrates the alignment of synthesis filters at output time 0 for use in the third preferred embodiment.

Turning now to FIG. 17, there is shown the alignment of synthesis filters at output time 0. The lowpass filter is centred at filter tap 0, while the highpass filter is centred at filter tap 1. In FIG. 17, the subband sample indices are shown as well as the synthesis output "time" index. The subband indices increase at ½ the rate as the output time due to the interpolation by 2. From FIG. 17, it can be seen that the number of subband samples required prior to the start of the highpass subband signal is 2 (and not 5 due to the interpolation by 2). On the other hand only one prior sample is required for the lowpass subband.

Figure 18:
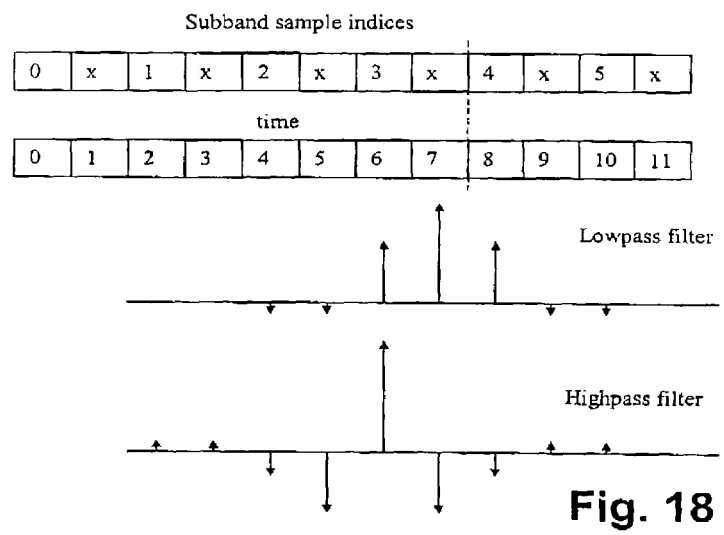
FIG. 18 illustrates the alignment of synthesis filters for synthesising the last sample in a block of subband samples for use in third preferred embodiment.

Turning now to FIG. 18, there is shown the alignment of synthesis filters for synthesising the last sample in a block of subband samples. FIG. 8 shows the alignment of the filters, to generate the last output sample, for filtering (synthesising) an even number of samples, namely 8. The lowpass centre tap is aligned at the last output sample (sample 7), while the highpass filter centre tap is aligned with the second to last output sample (sample 6) commensurate with the alignment at the start of filtering. The number of following samples required is thus 2 for both the highpass and lowpass subbands. (Note that this can also be seen from FIG. 17.)

In general for synthesising a portion of the signal of length 2K (assuming that the first sample in this 2K segment is at an even index location in the original image signal) we require the corresponding K samples from both the lowpass and highpass subbands. Further, for the lowpass subband we require the single preceding and the two following samples. For the highpass subband we require the two preceding and the two following samples This gives K+3 lowpass and K+4 highpass samples or 2K+7 in total.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

Figure 19:
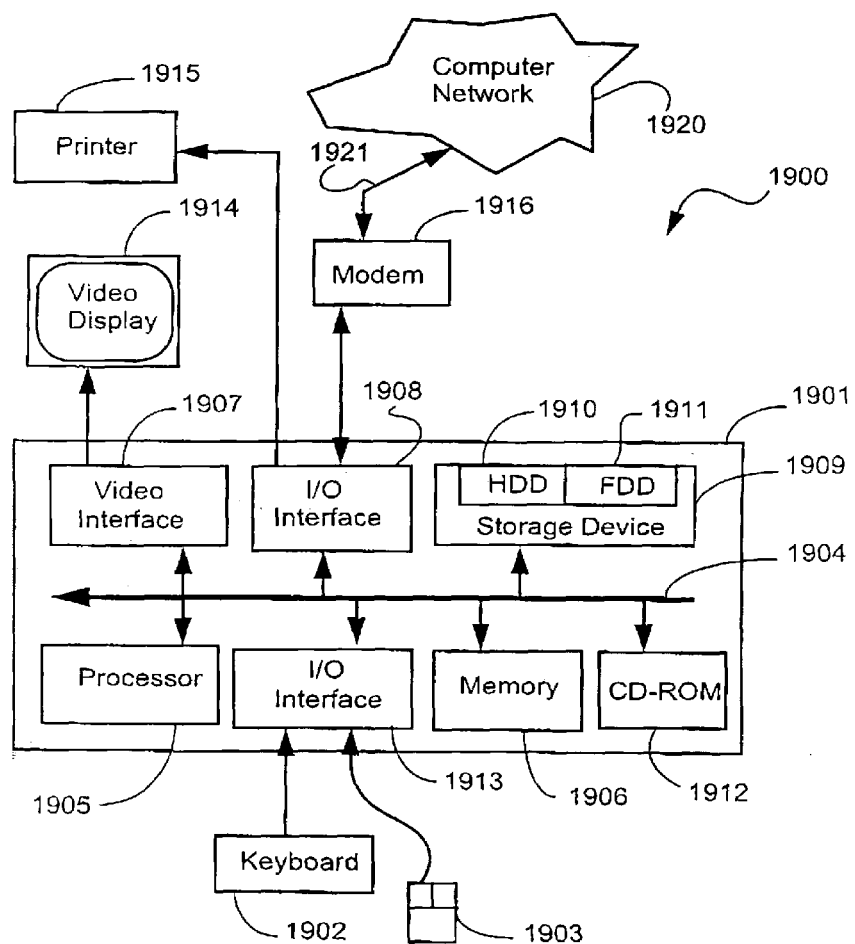
FIG. 19 is a block diagram of a general purpose computer with which the embodiments can be implemented.

3.0 Preferred Embodiments of Apparatus and Computer Readable Medium Comprising a Computer Program The methods of performing a two-dimensional discrete wavelet transform on a digital image in accordance with the preferred embodiments are preferably practiced using a conventional general-purpose computer system 1900, such as that shown in FIG. 19 wherein the methods are implemented as software, such as an application program executing within the computer system 1900. Similarly, the methods of performing a 2-D inverse DWT in accordance with the preferred embodiments are preferably practised using a conventional general-purpose computer 1900, wherein these methods may also be implemented as software. In particular, the steps of the methods are effected by instructions in the software that are carried out by the computer (e.g. Appendices A to C). The software may be divided into two separate parts; one part for carrying out the discrete wavelet transform methods; and another part to manage the user interface between the latter and the user. The software may be stored in a computer readable medium, including the storage devices described below, for example. The software is loaded into the computer from the computer readable medium, and then executed by the computer. The use of the computer readable medium in the computer preferably effects an advantageous apparatus for performing the preferred methods in accordance with the embodiments of the invention.

The computer system 1900 comprises a computer module 1901, input devices such as a keyboard 1902 and mouse 1903, output devices including a printer 1915 and a display device 1914. A Modulator-Demodulator (Modem) transceiver device 1916 is used by the computer module 1901 for communicating to and from a communications network 1920, for example connectable via a telephone line 1921 or other functional medium. The modem 1916 can be used to obtain access to the Internet, and other network systems, such as a Local Area Network (LAN) or a Wide Area Network (WAN).

The computer module 1901 typically includes at least one processor unit 1905, a memory unit 1906, for example formed from semiconductor random access memory (RAM) and read only memory (ROM), input/output (I/O) interfaces including a video interface 1907, and an I/O interface 1913 for the keyboard 1902 and mouse 1903 and optionally a joystick (not illustrated), and an interface 1908 for the modem 1916. A storage device 1909 is provided and typically includes a hard disk drive 1910 and a floppy disk drive 1911. A magnetic tape drive (not illustrated) may also be used. A CD-ROM drive 1912 is typically provided as a non-volatile source of data. The components 1905 to 1913 of the computer module 1901, typically communicate via an interconnected bus 1904 and in a manner which results in a conventional mode of operation of the computer system 1900 known to those in the relevant art. Examples of computers on which the embodiments can be practised include IBM-PC's and compatibles, Sun Sparcstations or alike computer systems evolved therefrom.

Typically, the application program(s) of the preferred embodiments are resident on the hard disk drive 1910 and read and controlled in its execution by the processor 1905. Intermediate storage of the program and any data fetched from the network 1920 may be accomplished using the semiconductor memory 1906, possibly in concert with the hard disk drive 1910. In some instances, the application program(s) may be supplied to the user encoded on a CD-ROM or floppy disk and read via the corresponding drive 1912 or 1911, or alternatively may be read by the user from the network 1920 via the modem device 1916. Still further, the software can also be loaded into the computer system 1900 from other computer readable medium including magnetic tape, a ROM or integrated circuit, a magneto-optical disk, a radio or infra-red transmission channel between the computer module 1901 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The preferred methods in accordance with the embodiments may alternatively be implemented in dedicated hardware such as one or more integrated circuits performing the functions or sub functions of the method. Such dedicated hardware may include graphic processors, digital signal processors, or one or more microprocessors and associated memories.

INDUSTRIAL APPLICABILITY

It is apparent from the above that the embodiment(s) of the invention are applicable to computer graphics, digital communication and related industries.

The foregoing describes some embodiments of the present invention, and modifications and/or changes can be made thereto without departing from the scope and spirit of the invention, the embodiments being illustrative and not restrictive.

APPENDIX A

C CODE IMPLEMENTATION OF THE 5/3 DWT BLOCK ENGINE

```c
#define ROUND_HP 1
#define ROUND_LP 2
METHODDEF_EXTERN(void)
L53_samp_block_engine (j_compress_ptr cinfo, j2k_fdwt_block_engine_ptr self,
    JVOIDARRAY input_sample_data, JDIMENSION start_row,
    JDIMENSION start_col, JDIMENSION block_height,
    JDIMENSION block_width, JVOIDARRAY vert_lift_mem,
    boolean is_first_block_row, boolean is_first_block_col, JVOIDARRAY horiz_lift_mem,
    JVOIDARRAY LLbuf, JDIMENSION LL_line_offset, JCOEFARRAY_EC HLblock,
    JCOEFARRAY_EC LHblock,JCOEFARRAY_EC HHblock, JFLOAT*qstep)
{
my_fdwt_block_engine_ptr fdwtbe = (my_fdwt_block_engine_ptr) self;
int i,j;
JSAMPARRAY sample_data = (JSAMPARRAY) input_sample_data;
JSAMPROW x0;
JSAMPROW x1;
JSAMPROW x2;
JSBUFROW_INT prev_H = (JSBUFROW_INT)vert_lift_mem[0] + start_col;
JSBUFROW_INT prev_Hhoriz = (JSBUFROW_INT)horiz_lift_mem[0];
JSBUFROW_INT first_col_verttxd = (JSBUFROW_INT)horiz_lift_mem[1];
JCOEF_EC L_2, L_1, L0, L1, L2;
JCOEF_EC H_2, H_1, H0, H1, H2;
    JSHORTROW LL;
    JCOEFROW_EC HL;
    JCOEFROW_EC LH;
    JCOEFROW_EC HH;
    /* Step 305 */
    if (is_first_block_row) {
    /* Step 310 */
    x0 = sample_data[0] + start_col;
    x1 = sample_data[1] + start_col;
    x2 = sample_data[2] + start_col;
    if (is_first_block_col)
        prev_H[0] = x1[0] + ((-x0[0] - x2[0] + ROUND_HP) >> 1); /* H0 (i=j=0) */
    for (j = 0; j < (int) block_width << 1; j+= 2) {
        prev_H[j+1] = x1[j+1] + ((-x0[j+1] - x2[j+1] + ROUND_HP) >> 1), /* H1 (i=0) */
        prev_H[j+2] = x1[j+2] + ((-x0[j+2] - x2[j+2] + ROUND_HP) >> 1); /* H2 (i=0) */
    }
}
/* Step 315 (i replaces m in this Code) */
for (i = 0; i < (int)block_height; i++) {
/* Set input and output row pointers */
int scan_row = i%4; // Entropy coding blocks are scanned column-wise in 4 row scan heights
x0 = sample_data[2*i] + start_col;
x1 = sample_data[2*i+1] + start_col;
x2 = sample_data[2*i+2] + start_col;
        LL = (JSHORTROW)*LLbuf++;
        LL += LL_line_offset;
        HL = *HLblock + scan_row; // Offset pointers by the scan row
        LH = *LHblock + scan_row;
        HH = *HHblock + scan_row;
        if (scan_row == 3) { // Update pointers for next scan (ie next set of 4 rows)
            *HLblock++;
            *LHblock++;
            *HHblock++;
        }
    /* Calculate first L_1 and H_1 vert and horiz transformed coefficients
    * and L0, H0 vert only transformed coefficients
    */
    /* Step 320 */
    if (is_first_block_col) {
    /* Step 325 */
    H_2 = x1[2] + ((-x0[2] - x2[2] + ROUND_HP) >> 1):
    H_1 = x1[1] + ((-x0[1] - x2[1] + ROUND_HP) >> 1);
    H0 = x1[0] + ((-x0[0] - x2[0] + ROUND_HP) >> 1);
    L_2 = x0[2] + ((int)(prev_H[2] + H_2 + ROUND_LP) >> 2);
    L_1 = x0[1] + ((int)(prev_H[1] + H_1 + ROUND_LP) >> 2);
    L0 = x0[0] + ((int)(prev_H[0] + H0 + ROUND_LP) >> 2);
    /* prev_H[1], and prev_H[2] are updated in the loop across row elements below */
    prev_H[0] =H0; /* Note that this updates prev_H[0] for the block below this block too */
    // Do the highpass row transform for L_1 and H_1
    L_1 = L_1 + ((int)(-L_2 - L0 + ROUND_HP) >> 1);
    H_1 = H_1 + ((int)(-H_2 - H0 + ROUND_HP) >> 1);
    }
        else {
        /* Get horizontal intermediate lifting values from horizontal lifting memory buffer */
        L_1 = prev_Hhoriz[0];
```

APPENDIX A-continued

C CODE IMPLEMENTATION OF THE 5/3 DWT BLOCK ENGINE

```
        H_1 = prev_Hhoriz[1];
        L0 = first_col_verttxd[0];
        H0 = first_col_verttxd[1];
    }
    //prev_H[0] = H0; /* Updates perv_H[0] for the block below */
    /* Loop in Steps 330-345 (j repaces 2n in this Code). Process cols j and j+1 */
    for (j = 0; j < (int) block_width << 1; j+= 2) {
     /*
       *First the vertical transform update steps - Equation 4
      */
     /* Highpass update for vertical transform */
     H1 = x1[j+1] + ((-x0[j+1] - x2[j+1] + ROUND_HP) >> 1);
     H2 = x1[j+2] + ((-x0[j+2] - x2[j+2] + ROUND_HP) >> 1);
     /* Lowpass update for vertical transform */
     L1 = x0[j+1] + ((int)(prev_H[j+1] + H1 + ROUND_LP) >> 2);
     L2 = x0[j+2] + ((int)(prev_H[j+2] + H2 + ROUND_LP) >> 2);
     /* Update vertical overlap for the next row (i<-i+1) iteration) */
     /* Equation 8- vertical lifting memory update (may be for block below current block*/
     prev_H[j+1] = H1;
     prev_H[j+2] = H2;
     /*
      * Then the vertical transform update - Equations (5) and (6)
      */
        /* Row transform the vertical lowpass coefficients */
        *HL = L1 = L1 + ((int)(-L0 - L2 + ROUND_HP) >> 1);
        HL += 4; //Jump to next column in scan, same scan row
        *LL++ = L0 + ((int)(L_1 + L1 + ROUND_LP) >> 2);
        L_1 = L1; // Update for next col iteration (j<-j+2) - part of equation (7)
        L0 = L2;
        /* Row transform the vertical highpass coefficients */
        *HH = H1 = H1 + ((int)(-H0 - H2 + ROUND_HP)>> 1);
        HH += 4;
        *LH = H0 + ((int)(H_1 + H1 +ROUND_LP) >> 2):
        LH += 4;
        H_1 = H1; // Update for next iteration (j<-j+2) - part of equation (7)
        H0 = H2;
    }
    /*
     * Update the horizontal lifting memory for the next block (noting L_1 = L1 etc have been
     * updated at the end of the above loop across row elements)
     */
    /* Step 350 */
    *prev_Hhoriz++ = L_1; /* L_1' (j = 0) for the next block row-wise */
    *prev_Hhoriz++ = H_1; /* H_1' (j = 0) for the next block row-wise */
    *first_col_verttxd++ = L0; /* L0 (j = 0) for the next block row-wise */
    *first_col_verttxd++ = H0; /* H0 (j = 0) for the next block row-wise */
    }
}
```

APPENDIX B

C CODE IMPLEMENTATION OF THE 9/7 DWT BLOCK ENGINE

```
/* 9/7 Lifting coefficients */
#define ALPHA -1.586134342f
#define BETA -0.05298011854f
#define GAMMA 0.8829110762f
#define DELTA 0.4435068522f
#define NORM_K_OVER_2 0.61508705304018f
#define NORM_1_OVER_K 0.81289306534524f
/* Useful Marcos */
#define VERTTX_START(col)
    Hv[col] = x1[col] + ALPHA * (x0[col] + x2[col]);
    Lv[col] = x0[col] + BETA * (Hv[col] + Hv[col]);
    Hv_next = x3[col] + ALPHA * (x2[col] + x4[col]);
    Lv_next = x2[col] + BETA * (Hv[col] + Hv_next);
    Hv_prev[col] = (Hv[col] + GAMMA * (Lv[col] + Lv_next))
#define VERTTX_UPDATE(L,H,col)
    Hv_next = x3[col] + ALPHA * (x2[col] + x4[col]);
    Lv_next = x2[col] + BETA * (Hv[col] + Hv_next);
    H = (Hv[col] + GAMMA * (Lv[col] + Lv_next));
    L = (Lv[col] + DELTA * (Hv_prev[col] + H)) * NORM_1_OVER_K;
    /* Update vertical overlap for the next row iteration (1 <- i+1) */
    Hv_prev[col] = H;
```

APPENDIX B-continued

C CODE IMPLEMENTATION OF THE 9/7 DWT BLOCK ENGINE

```
        H* = NORM_K_OVER_2;
        Lv[col] = Lv_next;
        Hv[col] = Hv_next
        #define VERTTX_NOUPDATE(L,H,col)
        Hv_next = x3[col] + ALPHA * (x2[col] + x4[col]);
        Lv_next = x2[col] + BETA * (Hv[col] + Hv_next);
        H = (Hv[col] + GAMMA * (Lv[col] + Lv_next));
        L = (Lv[col] + DELTA * (Hv_prev[col] + H)) * NORM_1_OVER_K;
        H *= NORM_K_OVER_2;
METHODDEF_EXTERN(void)
D97float_samp_block_engine (j_compress_ptr cinfo, j2k_fdwt_block_engine_ptr self,
        JVOIDARRAY input_sample_data, JDIMENSION start_row, JDIMENSION start_col,
        JDIMENSION block_height, JDIMENSION block_width,
        JVOIDARRAY vert_lift_mem, boolean is_first_block_row, boolean is_first_block_col,
        JVOIDARRAY horiz_lift_mem, JVOIDARRAY LLblock, JDIMENSION LL_line_offset,
        JCOEFARRAY_EC HLblock, JCOEFARRAY_EC LHblock,JCOEFARRAY_EC HHblock,
JFLOAT *qstep)
{
int i,j;
JSAMPARRAY sample_data = (JSAMPARRAY) input_sample_data;
JSAMPROW x0, x1, x2, x3, x4;
JSBUFROW_FLOAT Hv_prev = (JSBUFROW_FLOAT)vert_lift_mem[0] + start_col;
JSBUFROW_FLOAT Lv = (JSBUFROW_FLOAT)vert_lift_mem[1] + start_col;
JSBUFROW_FLOAT Hv = (JSBUFROW_FLOAT)vert_lift_mem[2] + start_col;
        JFLOAT Lv_next3, Lv_next4, Hv_next3, Hv_next4;
        JSBUFROW_FLOAT C_1_mem = (JSBUFROW_FLOAT)horiz_lift_mem[0];
        JSBUFROW_FLOAT C0_mem = (JSBUFROW_FLOAT)horiz_lift_mem[1];
        JSBUFROW_FLOAT C1_mem = (JSBUFROW_FLOAT)horiz_lift_mem[2];
        JSBUFROW_FLOAT C2_mem = (JSBUFROW_FLOAT)horiz_lift_mem[3];
        JSBUFROW_FLOAT first_col_verttxd = (JSBUFROW_FLOAT)horiz_lift_mem[1];
        JFLOAT L_1uu, L0u, L1u, L2;
        JFLOAT H_1uu, H0u, H1u, H2;
        JFLOAT L3, L4, H3, H4;
        JFLOATROW LL;
        JCOEFROW_EC HL;
        JCOEFROW_EC LH;
        JCOEFROW_EC HH,
/* Inverse of the quantisation step sizes. Scale the quantisation step size by */
/* the nominal range, which is the same as the input since we use the 1-1 normalisation */
JFLOAT scaleHL = (JFLOAT)1/(qstep[HL_BAND] * (1 << BITS_IN_JSAMPLE));
JFLOAT scaleLH = (JFLOAT)1/(qstep[LH_BAND] * (1 << BITS_IN_JSAMPLE));
JFLOAT scaleHH = (JFLOAT)1/(qstep[HH_BAND] * (1 << BITS_IN_JSAMPLE));
/* Step 305 */
it (is_first_block row) {
/* Step 310 - Update vertical lifting memory to effect a symmetric periodic extension
        of the top of the columns */
        JFLOAT Lv_next; Hv_next;
        x0 = sample_data[0] + start_col; /* Set row pointers to point at start of row in block */
        x1 = sample_data[1] + start_col;
        x2 = sample_data[2] + start_col;
        x3 = sample_data[3] + start_col;
        x4 = sample_data[4] + start_col;
        /* Only update prev_H[0] = H0(i=j=0) for the first block in the row. prev_H[2j +1]
        * and prev_H[2j+2] are updated in the main loop below (j = 0, 1, . . .) so that
        * prev_H contains the overlap data for the block below the current block at
        * the end of this function. prev_H[0] is not updated below so we need to be careful
        * not to overwrite it here (hence the following if statement)
        */
        if (is_first_block_col) {
        VERTTX_START(0);
        VERTTX_START(1);
        VERTTX_START(2);
        }
        for (j = 0; j < (int) block_width << 1; j+= 2) {
        VERTTX_START(j+3);
        VERTTX_START(j+4);
        }
 }
}
/* Step 315 (i replaces m in this code). Process pairs of input lines (row s2i, 2i+1) */
for (i = 0; i < (int)block_height; i++) {
        /* Set input and output row pointers */
        int scan_row = i%4; // Entropy coding blocks are scanned vertically in 4 row scan heights
        x2 = sample_data[2*i+2] + start_col;
        x3 = sample_data[2*i+3] + start_col;
        x4 = sample_data[2*i+4] + start_col;
        LL = (JFLOATROW)*LLblock++;
        LL += LL_line_offset;
```

APPENDIX B-continued

C CODE IMPLEMENTATION OF THE 9/7 DWT BLOCK ENGINE

```
        HL = *HLblock + scan_row; // Offset pointers by the scan row
        LH = *LHblock + scan_row;
        HH = *HHblock + scan_row;
        if (scan_row == 3) { // Update pointers for next scan (ie next set of 4 rows)
         *HLblock++;
         *LHblock++;
         *HHblock++;
    }
}
/* Step 320 */
if (is_first_block_col) {
    /* Step 325 */
    JFLOAT Lv_next, Hv_next;
    JFLOAT L2u, L3u, H2u, H3u;
// First update the vertical transform
VERTTX_UPDATE(L0u,H0u,0);
VERTTX_UPDATE(L1u,H1u,1);
VERTTX_UPDATE(L2,H2,2);
VERTTX_NOUPDATE(L3,H3,3); // Don't update the vertical lifting buffer
VERTTX_NOUPDATE(L4,H4,4); // (This is done for columns 3 and 4 in the inner loop below)
// Now do the necessary bits of the row transform
L1u = L1u + ALPHA * (L0u + L2);
L0u = L0u + BETA * (L1u + L1u);
        L3u = L3 + ALPHA * (L4 + L2);
        L2u = L2 + BETA * (L3u + L1u);
        L_1uu = L1u + GAMMA * (L2u + L0u);
        H1u = H1u + ALPHA * (H0u + H2);
        H0u = H0u + BETA * (H1u + H1u);
        H3u = H3 + ALPHA * (H4 + H2):
        H2u = H2 + BETA * (H3u + H1u):
        H_1uu = H1u + GAMMA * (H2u + H0u);
        }
        else {
        /* Get horizonal intermediate lifting values from the horizontal lifting memory buffer */
        L_1uu = C_1_mem[0];
        H_1uu = C_1_mem[1];
        L0u = C0_mem[0];
        H0u = C0_mem[1];
        L1u = C1_mem[0];
        H1u = C1_mem[1];
        L2 = C2_mem[0];
        H2 = C2_mem[1];
    }
/* Loop in Steps 330-245. Do the 2D analysis of samples in rows 2i and 2i+1.
(j replaces 2n in this code) */
for (j = 0; j < (int) block_width << 1; j+= 2) {
/* Step 340 */
// Equation 11 for columns j+3 and j+4
Hv_next3 = x[j+3] + ALPHA * (x2[j+ 3] + x4[j+3]);
Lv_next3 = x2[j+3] + BETA * (Hv[j+3] + Hv_next3);
Hv_next4 = x3[j+4] + ALPHA * (x2[j+4]) + x4[j+4];
H3 = Hv[j+3] + GAMMA * (Lv[j+3] + Lv_next3);
L3 = Lv[j+3] + DELTA * (Hv_prev[j+3] + H3);
L3 *= NORM_1_OVER_K; // Subband coefficients are scaled here
Hv_prev[j+3] = H3;
H3 *= NORM_K_OVER_2;
Lv_next4 = x2[j+4] + BETA * (Hv[j+4] + Hv_next4);
H4 = Hv[j+4] + GAMMA * (Lv[i+4] + Lv_next4);
L4 = Lv[j+4] + DELTA * (Hv_prev[j+4] + H4);
L4 *= NORM_1_OVER_K;
Hv_prev[j+4] = H4,
H4 *= NORM_K_OVER_2;
/* Update vertical lifting memory data for the next row iteration (i<-i+1)
        (and maybe for block below) */
Lv[j+3] = Lv_next3;
Lv[j+4] = Lv_next4;
Hv[j+3] = Hv_next3;
Hv[j+4] = Hv_next4;
/* Equation 12 */
// Row transform the current lowpass row (Input row 2i - pointed to by Lv)
L3 = L3 + ALPHA * (L2 + L4);
H3 = H3 + ALPHA * (H2 + H4); //Stick.this in here for speed -(b/c of floating point
L2 = L2 + BETA * (L1u + L3); // multiplication latency)
L1u = L1u + GAMMA * (L0u + L2);
*HL = (JCOEF_EC)(L1u * NORM_K_OVER_2 * scaleHL);
HL += 4;
        H2 = H2 + BETA * (H1u + H3);
         *LL++ = (L0u + DELTA * (L_1uu + L1u)) * NORM_1_OVER_K;
```

APPENDIX B-continued

C CODE IMPLEMENTATION OF THE 9/7 DWT BLOCK ENGINE

```
    // Update local horizontal intermediate lifting coefficients for next iteration (j <- j+2)
    L__1uu == L1u;
    L0u = L2;
    L1u = L3;
    L2 = L4:
    /* Equation 13 */
    // Row transform the current highpass row (input row 2i+1 - pointed to by Hv)
    H1u = H1u + GAMMA * (H0u + H2);
    *HH = (JCOEF_EC) (H1u * NORM_K_OVER_2 * scaleHH);
    HH += 4;
    *LH = (JCOEF_EC) ((H0u + DELTA * (H__1uu + H1u)) * NORM_1_OVER K * scaleLH);
    LH += 4;
    // Update local horizontal intermediate lifting coefficients for next iteration (j <- j+2)
    H__1uu = H1u;
    H0u = H2;
    H1u = H3;
    H2 = H4;
    }
/*
 * Update the horizontal lifting memory for the next block (noting L__1 = L1 etc have been
 * updated at the end of the above loop across row elements)
 */
/* CHECK: the following is o.k. when the block_width = 0 ie L__1 etc have not been updated */
*C__1_mem++ = L__1uu; /* L__1' (j = 0) for the next block row-wise */
*C__1_mem++ = H__1uu; /* H__1' (j = 0) for the next block row-wise */
    *C0_mem++ = L0u; /* L0u (j = 0) for the next block row-wise */
    *C0_mem++ = H0u; /* H0u (j = 0) for the next block row-wise */
    *C1_mem++ = L1u; /* L1u (j = 0) for the next block row-wise */
    *C1_mem++ = H1u; /* H1u (j = 0) for the next block row-wise */
    *C2_mem++ = L2: /* L2 (j = 0) for the next block row-wise */
    *C2_mem*++ = H2; /* H2 (j = 0) for the next block row-wise */
        }
}
```

APPENDIX C

C CODE IMPLEMENTATION OF THE 5/3 INVERSE DWT BLOCK ENGINE

```
#define ROUND_HP 1
#define ROUND_LP 2
METHODDEF_EXTERN(void)
L53_samp_iblock_engine (
    j2k_decoder_ptr cinfo,
    j2k_idwt_block_engine_ptr self,
    JVOIDARRAY output_data,
    JDIMENSION start_row,
    JDIMENSION start_col,
    JDIMENSION block_height,
    JDIMENSION block_width,
    JVOIDARRAY vert_lift_mem,
    boolean is first_block_row,
    boolean is first_block_col,
    JVOIDARRAY horiz_lift_mem,
    JVOIDARRAY LLbuf,
    JDIMENSION ip_LL_line_offset,
    JCOEFARRAY_EG HLblock,
    JCOEFARRAY_EC LHblock,
    JCOEFARRAY_EC HHblock,
    JFLOAT *qstep)
{
    my_idwt_block_engine_ptr idwtbe = (my_idwt_block_engine_ptr) self;
    int m,n;
    JSAMPARRAY sample_data = (JSAMPARRAY) output_data;
    JSAMPROW x1;
    JSAMPROW x2;
    // XLi is coefficient XL(m+1, 2n+i), and similarly XHi is coefficient XH(m+1, 2n+i).
    JCOEF_EC XL0 = 0, XL1 = 0, XL2 = 0:
    JCOEF_EC XH0 = 0, XH1 = 0, XH2 = 0;
    JCOEF_EC HLcur, HHcur; // HLcur = HL[m+1, n], HHcur = HH[m+1,n].
    // Note: XL0, XL1, . . . , XH0, XH1, . . . etc should be ints. for speed
    JCOEFROW_EC LL;
    JCOEFROW_EC HL;
    JCOEFROW_EC LH;
    JCOEFROW_EC HH;
```

APPENDIX C-continued

C CODE IMPLEMENTATION OF THE 5/3 INVERSE DWT BLOCK ENGINE

```
// XHprev points at row m of XH, and similarly XLprev points at row m of XL
JCOEFROW_EC XHprev = (JCOEFROW_EC)vert_lift_mem[0] + start_col;
JCOEFROW_EC XLprev = (JCOEFROW_EC)vert_lift_mem[1] + start_col;
JCOEFROW_EC horiz_itx_Lprev = (JCOEFROW_EC)horiz_lift_mem[0];
JCOEFROW_EC horiz_itx_Hcur = (JCOEFROW_EC)horiz_lift_mem[1];
/*
* Initiliase the vertical lifting state (XHprev only) for the first iteration on m (m=-1).
* We need to generate XHprev[2n+1], XHprev[2n+2] for n = -1, 0, . . . block_width-1, for the
* vertical synthesis of row m+1 = 0 below. We do not need to generate
* XLprev, as this does not effect the first row (XHprev here is row -1).As XHprev
* contains pre-update values we only need do the inverse row transformion (as in
    * producing XH1 and XH2, for n = 1, 0, . . . block_width-1.)
    */
    if (is_first_block_row) {
    // First update the inverse row transform values
    LH = LHblock[0];
    HH = HHblock[0];
    if (is_first_block_col) { // Generate horizontal lifting state to effect a symm. extension
    XH0 = 0; // we don't care here
    HHcur = HH[0];
    }
    else { // Get horizontal lifting state from buffer
    XH0 = horiz_itx_Lprev[1]; //Highpass row is in row 2m+1
    HHcur = horiz_itx_Hcur[1];
    }
    for (n = -1; n < (int)block_width-1; n++) {
    XHprev[2*n+2] = LH[n+1] - ((HHcur + HH[n+1] + ROUND_LP) >> 2); // XH2 value
    XHprev[2*n+1] = HHcur - ((-XH0 - XHprev[2*n+2] + ROUND_HP) >> 1); // XH1 value
    XH0 = XHprev[2*n+2]; // Update for next interation (on n)
    HHcur = HH[n+1];
    }
}
else {
    //Lifting state was intialised when the block above the current block was synthesized
}
for (m = -1; m < (int)block_height-1; m++) {
// Set input and output row pointers
x1 = sample_data[2*m+1+start_row] + start_col;
    x2 = sample_data[2*m+2+start_row] + start_col;
    LL = (JCOEFROW_EC)LLbuf[m+1];
    LL += ip_LL_line_offset;
    HL = HLblock[m+1]; // Offset pointers by the scan row
    LH = LHblock[m+1];
    HH = HHblock[m+1];
    //Initialise the horizontal lifting state for the first iteration across the rows.(n = -1)
    if (is_first_block_col) {
        //We don't need XL0 and XH0, because we don't care about output.sample -1 in this case
        1
        HLcur = HL[0]; // Symmetric extension condition
        HHcur = HH[0];
    }
    else {
    // "Current" row being synthesized is row m+1, hence get state from rows 2(m+1)=2m+2
    // and 2(m+1)+1 = 2m+3
    XL0 = horiz_itx_Lprev[2*m+2];
    XH0 = horiz_itx_Lprev[2*m+3];
    HLcur = horiz_itx_Hcur[2*m+2];
    HHcur = horiz_itx_Hcur[2*m+3];
}
for (n = -1; n < (int) block_width-1; n++) {
// Horizontal sythesis of LL and HL
XL2 = LL[n+1] - ((HLcur + HL[n+1] + ROUND_LP) >> 2);
XL1 = HLcur - ((-XL0 - XL2 + ROUND_HP) >> 1);
HLcur = HL[n+1]; // Updates for next iteration across row (on n)
    XL0 = XL2;
    // Horizontal sythesis of LL and HL
    XH2 = LH[n+1] - ((HHcur + HH[n+1] + ROUND_LP) >> 2);
    XH1 = HHcur - ((-XHO - XH2 + ROUND_HP) >> 1);
    HHcur = HH[n+1]; // Updates for next iteration across row (on n)
    XH0 = XH2;
    // Vertical synthesis of XL and XH, column2n+1
        x2[2*n+1] = XL1    -((XHprev[2*n+1] + XH1 + ROUND_LP) >> 2);
        x1[2*n+1] = XHprev[2*n+1] - ((-XLprev[2*n+1] - x2[2*n+1] ROUND_HP) >> 1);
        XHprev[2*n+1] = XH1; // Update for next iteration down column (on m)
        XLprev[2*n+1] = x2[2*n+1];
        // Vertical synthesis of XL and XH, column2n+2
        x2[2*n+2] = XL2    -((XHprev[2*n+2] + XH2 + ROUND_LP) >> 2);
```

APPENDIX C-continued

C CODE IMPLEMENTATION OF THE 5/3 INVERSE DWT BLOCK ENGINE

```
        x1[2*n+2] = XHprev[2*n+2] - ((-XLprev[2*n+2] - x2[2*n+2] + ROUND_HP) >> 1);
        XHprev[2*n+2] = XH2; // Update for next iteration down column (on m)
        XLprev[2*n+2] = x2[2*n+2];
    }
    /*
     * Update the horizontal lifting memory for the next block (noting L_1 = XL1 etc have been
     * updated at the end of the above loop across row elements)
     */
    horiz_itx_Lprev[2*m+2] = XL0;
    horiz_itx_Lprev[2*m+3] = XH0;
    horiz_itx_Hcur[2*m+2] = HLcur;
    horiz_itx_Hcur[2*m+3] = HHcur;
        }
}
```

The invention claimed is:

1. A method of two-dimensional discrete wavelet transforming of an image, the method comprising the steps of:

forming the image into a plurality of blocks, there being a first plurality of blocks spanning a first dimension of the image and a second plurality of blocks spanning a second dimension of the image, each block comprising a plurality of pixels in each dimension; and processing the blocks in raster order by two-dimensional discrete wavelet transforming a current block of pixels to generate a corresponding current output block of subband data before either a one-dimensional discrete wavelet row or column transformation of a next block of pixels is completed, said transforming step including using intermediate lifting values of a plurality of previous output blocks of subband data, the intermediate lifting values comprising:

HL and HH two-dimensional subband data of a previous output block of subband data corresponding to a block of pixels in the same row as the current block and adjacent thereto;

L and H one-dimensional column subband data of the previous output block of subband data corresponding to the block of pixels in the same row as the current block of pixels and adjacent thereto; and first and second H one-dimensional column subband data of a previous output block of subband data corresponding to a block of pixels in the same column as the current block of pixels and adjacent thereto.

2. A method according to claim 1, wherein the current output block of subband data is generated using a filter being one of a 5/3 wavelet filter and a 9/7 wavelet filter.

3. A method according to claim 1, wherein said transforming step includes a non-aligned one-dimensional discrete wavelet column transformation of the current block and an aligned one-dimensional discrete wavelet row transformation of the current block.

4. A method according to claim 1, wherein each of substantially all of the blocks comprises at least one quadruplet of the pixels.

5. A method according to claim 4, wherein one portion of the image comprises blocks of at least one quadruplet of pixels of a size H×H and at least one edge of the image comprises blocks of pixels of a size smaller than H×H, and said transforming step includes extending the blocks of pixels of the smaller size to the blocks of at least one quadruplet of the pixels of size H×H.

6. A method according to claim 1, wherein the intermediate lifting values are stored in a buffer.

7. A method according to claim 1, wherein said transforming step is carried out by using values of pixels of the image stored in a first memory and the intermediate lifting values stored in a lifting memory, the first memory storing only necessary pixel values for calculating the subband data.

8. A method according to claim 7, wherein the values of pixels of the image stored in the first memory are extracted from a second memory which operates more slowly than the first memory.

9. A method according to claim 7, wherein the first memory is on the same chip as a filtering processor used in said transforming step, and values of pixels of the image stored in the first memory are extracted from a second memory which is on another chip.

10. A method of two-dimensional discrete wavelet transforming of an image, the method comprising the steps of:

forming the image into a plurality of blocks arranged in a predetermined raster order, there being a first plurality of blocks spanning a first dimension of the image and a second plurality of blocks spanning a second dimension of the image, each block comprising a quadruplet of pixels;

scanning the blocks in the predetermined raster order;

two-dimensional discrete wavelet transforming a current block of pixels to generate a corresponding current output block of subband data before either a one-dimensional discrete wavelet row or column transformation of a next block of pixels is completed;

storing intermediate lifting values generated during said transforming step of the current output block of subband data; and repeating said transforming for the scanned blocks of pixels from the next block of pixels to a last block of pixels, said storing step for the scanned blocks of pixels from the next block of pixels to a penultimate block of pixels, wherein said transforming step includes using intermediate lifting values generated and stored during a plurality of said transforming and storing steps of a plurality of previous output blocks of subband data, the intermediate lifting values comprising:

HL and HH two-dimensional subband data generated and stored during said transforming and storing steps of a previous output block of subband data corresponding to a block of pixels in the same row as the current block and adjacent thereto;

L and H one-dimensional column subband data generated and stored during said transforming and storing steps of the previous output block of subband data corresponding to the block of pixels in the same row as the current block and adjacent thereto; and first and second H one-dimensional column subband data generated and stored during said transforming and storing steps of a previous output block of subband data corresponding to a block of pixels in the same column as the current block of quadruplet of pixels and adjacent thereto.

11. A method according to claim 10, wherein the current output block of subband data is generated using a filter being one of a 5/3 wavelet filter and a 9/7 wavelet filter.

12. A method according to claim 10, wherein one portion of the image comprises all of the blocks of quadruplets of pixels and at least one edge of the image comprises blocks of doublets of pixels or blocks of singular pixels, and said transforming step includes the sub-step of:

extending the blocks of doublets of the pixels or the blocks of singular pixels to blocks of quadruplets of pixels.

13. A method according to claim 10, wherein the intermediate lifting values are stored in a buffer.

14. A method according to claim 10, wherein said transforming step is carried out by using values of pixels of the image stored in a first memory and the intermediate lifting values stored in a lifting memory, the first memory storing only necessary pixel values for calculating the subband data.

15. A method according to claim 14, wherein the values of pixels of the image stored in the first memory are extracted from a second memory which operates more slowly than the first memory.

16. A method according to claim 14, wherein the first memory is on the same chip as a filtering processor used in said transforming step, and values of pixels of the image stored in the first memory are extracted from a second memory which is on another chip.

17. A method of two-dimensional inverse discrete wavelet transforming of subband data, the method comprising the steps of:

forming the subband data into a plurality of blocks, there being a first plurality of blocks spanning a first dimension of the subband data and a second plurality of blocks spanning a second dimension of the subband data, each block comprising at least one quadruplet of LL, HL, LH and HH subband coefficients; and two-dimensional inverse discrete wavelet transforming a current block of at least one quadruplet of subband coefficients to generate a corresponding current output block of pixels before either a one-dimensional inverse discrete wavelet row or column transformation of a next block of subband coefficients is completed, said transforming step including using intermediate lifting values of a plurality of previous output blocks of pixels, the intermediate lifting values comprising:

two-dimensional data of a previous output block corresponding to a block of subband coefficients in the same row as the current block and adjacent thereto;

one-dimensional column data of the previous output block corresponding to the block of subband coefficients in the same row as the current block and adjacent thereto; and first and second one-dimensional column data of a previous output block corresponding to a block of subband coefficients in the same column as the current block and adjacent thereto.

18. A method according to claim 17, wherein the current output block of pixels is generated using a filter being one of a 5/3 wavelet filter and a 9/7 wavelet filter.

19. A method according to claim 17, wherein the intermediate lifting values are stored in a buffer.

20. A method according to claim 17, wherein said transforming step is carried out by using subband data of the image stored in a first memory and the intermediate lifting values stored in a lifting memory, the first memory storing only necessary subband data values for calculating a block of pixels.

21. A method according to claim 20, wherein the subband data of the image stored in the first memory are extracted from a second memory which operates more slowly than the first memory.

22. A method according to claim 20, wherein the first memory is on the same chip as a filtering processor used in said transforming step, and subband data of the image stored in the first memory are extracted from a second memory which is on another chip.

23. A method of two-dimensional inverse discrete wavelet transforming subband data, the method comprising the steps of:

forming the subband data into a plurality of blocks arranged in a predetermined raster order, there being a first plurality of blocks spanning a first dimension of the subband data and a second plurality of blocks spanning a second dimension of the subband data, each block comprising LL, HL, LH and HH subband coefficients;

scanning the blocks in the predetermined raster order;

two-dimensional inverse discrete wavelet transforming a current block of at least one the quadruplet of LL, HL, LH and HH subband coefficients to generate a corresponding current output block of pixels before either a one-dimensional inverse discrete wavelet row or column transformation of a next block of LL, HL, LH and HH subband coefficients is completed;

storing intermediate lifting values generated during said transforming step of the current output block of pixels; and repeating said transforming step for the scanned blocks of LL, HL, LH and HH subband coefficients from the next block of LL, HL, LH and HH subband coefficients to a last block of LL, HL, LH and HH subband coefficients and said storing step for the scanned blocks of LL, HL, LH and HH subband coefficients from the next block of LL, HL, LH and HH subband coefficients to a penultimate block of LL, HL, LH and HH subband coefficients, wherein said transforming step includes using intermediate lifting values generated and stored during a plurality of said transforming and storing steps of a plurality of previous output blocks of pixels, the intermediate lifting values comprising:

two-dimensional data corresponding to a block of subband coefficients in the same row as the current block and adjacent thereto;

one-dimensional column data corresponding to the block of subband coefficients in the same row as the current block and adjacent thereto; and first and second one-dimensional column data corresponding to a block of subband coefficients in the same column as the current block and adjacent thereto.

24. A method according to claim 23, wherein the current output block of pixels is generated using a filter being one of a 5/3 wavelet filter and a 9/7 wavelet filter.

25. A method according to claim 23, wherein the intermediate lifting values are stored in a buffer.

26. A method according to claim 23, wherein said transforming step is carried out by using subband data of the image stored in a first memory and the intermediate lifting values stored in a lifting memory, the first memory storing only necessary subband data values for calculating a block of pixels.

27. A method according to claim 26, wherein the subband data of the image stored in the first memory are extracted from a second memory which operates more slowly than the first memory.

28. A method according to claim 26, wherein the first memory is on the same chip as a filtering processor used in said transforming step, and subband data of the image stored in the first memory are extracted from a second memory which is on another chip.

29. An apparatus for two-dimensional discrete wavelet transforming an image, the apparatus comprising:
means for storing a plurality of pixels of the image;
means for forming the image into a plurality of blocks, there being a first plurality of blocks spanning a first dimension of the image and a second plurality of blocks spanning a second dimension of the image, each block comprising a plurality of pixels in each dimension; and
means for two-dimensional discrete wavelet transforming a current block of pixels to generate a corresponding current output block of subband data before either a one-dimensional discrete wavelet row or column transformation of a next block of pixels is completed, said transforming means using intermediate lifting values of a plurality of previous output blocks of subband data, the intermediate lifting values comprising:
HL and HH two-dimensional subband data of a previous output block of subband data corresponding to a block of pixels in the same row as the current block and adjacent thereto;
L and H one-dimensional column subband data of the previous output block of subband data corresponding to the block of pixels in the same row as the current block of pixels and adjacent thereto; and
first and second H one-dimensional column subband data of a previous output block of subband data corresponding to a block of pixels in the same column as the current block of pixels and adjacent thereto.

30. An apparatus for two-dimensional discrete wavelet transforming an image, the apparatus comprising:
means for forming the image into a plurality of blocks arranged in a predetermined raster order, there being a first plurality of blocks spanning a first dimension of the image and a second plurality of blocks spanning a second dimension of the image, each block comprising a quadruplet of pixels;
means for scanning the blocks in the predetermined raster order;
means for two-dimensional discrete wavelet transforming a current block of pixels to generate a corresponding current output block of subband data before either a one-dimensional discrete wavelet row or column transformation of a next block of pixels is completed;
means for storing intermediate lifting values generated during the operation of said transforming means of the current output block of subband data; and
means for repeating the operation of said transforming means for the scanned blocks of pixels from the next block of pixels to a last block of pixels and the operation of said storing means for the scanned blocks of pixels from the next block of pixels to a penultimate block of pixels,
wherein said transforming means uses intermediate lifting values generated and stored during the operations of said transforming and storing means for a plurality of previous output blocks of subband data, the intermediate lifting values comprising:
HL and HH two-dimensional subband data generated and stored during the processing of a previous output block of subband data corresponding to a block of pixels in the same row as the current block and adjacent thereto;
L and H one-dimensional column subband data generated and stored during the processing of the previous output block of subband data corresponding to the block of pixels in the same row as the current block and adjacent thereto; and
first and second H one-dimensional column subband data generated and stored during the processing of a previous output block of subband data corresponding to a block of pixels in the same column as the current block of quadruplet of pixels and adjacent thereto.

31. An apparatus for two-dimensional inverse discrete wavelet transforming subband data, the apparatus comprising:
means for storing subband data as a plurality of blocks, there being a first plurality of blocks spanning a first dimension of the subband data and a second plurality of blocks spanning a second dimension of the subband data, each block comprising at least one quadruplet of LL, HL, LH and HH subband coefficients; and
means for two-dimensional inverse discrete wavelet transforming a current block of at least one quadruplet of subband coefficients to generate a corresponding current output block of pixels before either a one-dimensional inverse discrete wavelet row or column transformation of a next block of subband coefficients is completed, using intermediate lifting values of a plurality of previous output blocks of pixels, the intermediate lifting values comprising:
two-dimensional data of a previous output block corresponding to a block of subband coefficients in the same row as the current block and adjacent thereto;
one-dimensional column data of the previous output block corresponding to the block of subband coefficients in the same row as the current block and adjacent thereto; and
first and second one-dimensional column data of a previous output block corresponding to a block of subband coefficients in the same column as the current block and adjacent thereto.

32. An apparatus for two-dimensional inverse discrete wavelet transforming subband data, the apparatus comprising:
means for forming the subband data into a plurality of blocks arranged in a predetermined raster order, there being a first plurality of blocks spanning a first dimension of the subband data and a second plurality of blocks spanning a second dimension of the subband data, each block comprising LL, HL, LH and HH subband coefficients;
means for two-dimensional scanning the blocks in the predetermined raster order;

means for inverse discrete wavelet transforming a current block of LL, HL, LH and HH subband coefficients to generate a corresponding current output block of pixels before either a one-dimensional inverse discrete wavelet row or column transformation of a next block of LL, HL, LH and HH subband coefficients is completed;

means for storing intermediate lifting values generated during operation of said transforming means of the current output block of pixels; and means for repeating the operation of said transforming means for the scanned blocks of LL, HL, LH and HH subband coefficients from the next block of LL, HL, LH and HH subband coefficients to a last block of LL, HL, LH and HH subband coefficients and the operation of said storing means for the scanned blocks of LL, HL, LH and HH subband coefficients from the next block of LL, HL, LH and HH subband coefficients to a penultimate block of LL, HL, LH and HH subband coefficients, wherein said transforming means uses intermediate lifting values generated and stored during the operations of said transforming and storing means for a plurality of previous output blocks of pixels, the intermediate lifting values comprising:

two-dimensional data corresponding to a block of subband coefficients in the same row as the current block and adjacent thereto;

one-dimensional column data corresponding to the block of subband coefficients in the same row as the current block and adjacent thereto; and first and second one-dimensional column data corresponding to a block of subband coefficients in the same column as the current block and adjacent thereto.

33. A computer readable medium encoded with a computer program which, when executed by a computer, causes the computer to perform steps for two-dimensional discrete wavelet transforming an image, the computer program comprising:

code for a forming step, of forming the image into a plurality of blocks, there being a first plurality of blocks spanning a first dimension of the image and a second plurality of blocks spanning a second dimension of the image, each block comprising a plurality of pixels in each dimension; and code for a two-dimensional discrete wavelet transforming step, of two-dimensional discrete wavelet transforming a current block of pixels to generate a corresponding current output block of subband data before either a one-dimensional discrete wavelet row or column transformation of a next block of pixels is completed, said transforming step includes using intermediate lifting values of a plurality of previous output blocks of subband data, the intermediate lifting values comprising:

HL and HH two-dimensional subband data of a previous output block of subband data corresponding to a block of pixels in the same row as the current block and adjacent thereto;

L and H one-dimensional column subband data of the previous output block of subband data corresponding to the block of pixels in the same row as the current block of pixels and adjacent thereto; and first and second H one-dimensional column subband data of a previous output block of subband data corresponding to a block of pixels in the same column as the current block of pixels and adjacent thereto.

34. A computer readable medium encoded with a computer program which, when executed by a computer, causes the computer to perform steps for two-dimensional discrete wavelet transforming an image, the computer program comprising:

code for a forming step, of forming the image into a plurality of blocks arranged in a predetermined raster order, there being a first plurality of blocks spanning a first dimension of the image and a second plurality of the blocks spanning a second dimension of the image, each block comprising a quadruplet of pixels;

code for a scanning step, of scanning the blocks in the predetermined raster order;

code for a two-dimensional discrete wavelet transforming step, of two-dimensional discrete wavelet transforming a current block of pixels to generate a corresponding current output block of subband data before either a one-dimensional discrete wavelet row or column transformation of a next block of pixels is completed;

code for a storing step, of storing intermediate lifting values generated during the transforming of the current output block of subband data performed by said code for a two-dimensional discrete wavelet transforming step; and code for repeating said code for a two-dimensional discrete wavelet transforming step for the scanned blocks of pixels from the next block of pixels to a last block of pixels and code for said storing step for the scanned blocks of pixels from the next block of pixels to a penultimate block of pixels, wherein the transforming performed by said code for a two-dimensional discrete wavelet transforming step includes using intermediate lifting values generated and stored during operation of said code for a transforming step and code for a storing step for a plurality of previous output blocks of subband data, the intermediate lifting values comprising:

HL and HH two-dimensional subband data generated and stored during the processing of a previous output block of subband data corresponding to a block of pixels in the same row as the current block and adjacent thereto;

L and H one-dimensional column subband data generated and stored during the processing of the previous output block of subband data corresponding to the block of pixels in the same row as the current block and adjacent thereto; and first and second H one-dimensional column subband data generated and stored during the processing of a previous output block of subband data corresponding to a block of pixels in the same column as the current block of quadruplet of pixels and adjacent thereto.

35. A computer readable medium encoded with a computer program which, when executed by a computer, causes the computer to perform steps for two-dimensional inverse discrete wavelet transforming subband data, the computer program comprising:

code for a forming step, of forming the subband data into a plurality of blocks, there being a first plurality of blocks spanning a first dimension of the subband data and a second plurality of blocks spanning a second dimension of the subband data, each block comprising at least one quadruplet of LL, HL, LH and HH subband coefficients;

code for a two-dimensional inverse discrete wavelet transforming step, of two-dimensional inverse discrete wavelet transforming a current block of at least one quadruplet of subband coefficients to generate a corresponding current output block of pixels before either a one-dimensional inverse discrete wavelet row or column transformation of a next block of subband coefficients is completed, said code for a two-dimensional inverse discrete wavelet transforming step includes using intermediate lifting values of a plurality of previous output blocks of pixels, the intermediate lifting values comprising:

two-dimensional data of a previous output block corresponding to a block of subband coefficients in the same row as the current block and adjacent thereto;

one-dimensional column data of the previous output block corresponding to the block of subband coefficients in the same row as the current block and adjacent thereto; and first and second one-dimensional column data of a previous output block corresponding to a block of subband coefficients in the same column as the current block and adjacent thereto.

36. A computer readable medium encoded with a computer program which, when executed by a computer, causes the computer to perform steps for two-dimensional inverse discrete wavelet transforming subband data, the computer program comprising:

code for a forming step, of forming the subband data into a plurality of blocks arranged in a predetermined raster order, there being a first plurality of blocks spanning a first dimension of the subband data and a second plurality of blocks spanning a second dimension of the subband data, each block comprising LL, HL, LH and HH subband coefficients;

code for a scanning step, of scanning the blocks in the predetermined raster order;

code for a two-dimensional inverse discrete wavelet transforming step, of two-dimensional inverse discrete wavelet transforming a current block of LL, HL, LH and HH subband coefficients to generate a corresponding current output block of pixels before either a one-dimensional inverse discrete wavelet row or column transformation of a next block of LL, HL, LH and HH subband coefficients is completed;

code for a storing step, of storing intermediate lifting values generated during said code for a two-dimensional inverse discrete wavelet transforming step of the current output block of pixels; and code for a repeat step, of repeating the operation of said code for a two-dimensional inverse discrete wavelet transforming step for the scanned blocks of LL, HL, LH and HH subband coefficients from the next block of LL, HL, LH and HH subband coefficients to a last block of LL, HL, LH and HH subband coefficients and said code for a storing step for the scanned blocks of LL, HL, LH and HH subband coefficients from the next block of LL, HL, LH and HH subband coefficients to a penultimate block of LL, HL, LH and HH subband coefficients, wherein the transforming performed by said code for a two-dimensional inverse discrete wavelet transforming step includes using intermediate lifting values generated and stored during operations of said code for a transforming step and step for a storing code for a plurality of previous output blocks of pixels, the intermediate lifting values comprising:

two-dimensional data corresponding to a block of subband coefficients in the same row as the current block and adjacent thereto;

one-dimensional column data corresponding to the block of subband coefficients in the same row as the current block and adjacent thereto; and first and second one-dimensional column data corresponding to a block of subband coefficients in the same column as the current block and adjacent thereto.

\* \* \* \* \*